US009179696B2

(12) United States Patent
Jacobsen et al.

(10) Patent No.: US 9,179,696 B2
(45) Date of Patent: *Nov. 10, 2015

(54) APPARATUS AND SYSTEM FOR POPPING KERNELS

(71) Applicant: Sterling L.C., Salt Lake City, UT (US)

(72) Inventors: Stephen C. Jacobsen, Salt Lake City, UT (US); John McCullough, Salt Lake City, UT (US)

(73) Assignee: STERLING L.C., Salt Lake City, UT (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/794,210

(22) Filed: Mar. 11, 2013

(65) Prior Publication Data

US 2014/0251156 A1    Sep. 11, 2014

(51) Int. Cl.
*A23L 1/18*    (2006.01)
*H05B 6/64*    (2006.01)
*A23L 1/01*    (2006.01)
*H05B 6/70*    (2006.01)
*H05B 6/78*    (2006.01)

(52) U.S. Cl.
CPC .............. *A23L 1/1812* (2013.01); *A23L 1/0128* (2013.01); *H05B 6/6485* (2013.01); *A23L 1/1815* (2013.01); *H05B 6/707* (2013.01); *H05B 6/782* (2013.01)

(58) Field of Classification Search
CPC ........ H05B 6/647; H05B 6/6485; H05B 6/70; H05B 6/701; H05B 6/707; H05B 6/782; A23L 1/1812; A23L 1/1815
USPC ............ 99/323.4, 323.5, 323.6, 323.7, 323.8, 99/323.9, 323.11; 219/690, 701, 725, 734, 219/747, 750
See application file for complete search history.

(56) References Cited

U.S. PATENT DOCUMENTS

| 2,602,134 | A | 7/1952 | Nelson |
| 2,922,355 | A | 1/1960 | Green |
| 4,072,091 | A | 2/1978 | Richardson |
| 4,120,236 | A | 10/1978 | Blomberg |
| 4,156,806 | A | 5/1979 | Teich et al. |
| 4,158,760 | A | 6/1979 | Bowen et al. |
| 4,166,208 | A | 8/1979 | Martel et al. |
| 4,178,843 | A | 12/1979 | Crabtree et al. |

(Continued)

FOREIGN PATENT DOCUMENTS

| JP | 63003773 A | 1/1988 |
| JP | 402013723 | * 1/1990 .................... 219/734 |

OTHER PUBLICATIONS

Office Action from U.S. Appl. No. 13/794,562 dated Mar. 3, 2014.

(Continued)

*Primary Examiner* — Reginald L Alexander
(74) *Attorney, Agent, or Firm* — Morriss O'Bryant Compagni, PC

(57) ABSTRACT

The present invention relates to improved devices and methods for popping popcorn, comprising moving popcorn kernels within a heating chamber with airflow and subjecting the popcorn kernels to focused microwave energy sufficient to cause the popcorn kernels to pop. In some embodiments, the devices and methods utilize a single-mode resonant microwave applicator to generate a standing microwave energy field comprising an array of one or more anti-node high intensity microwave regions and subjecting popcorn kernels to the microwave energy in the one or more high intensity microwave regions.

36 Claims, 9 Drawing Sheets

(56) References Cited

U.S. PATENT DOCUMENTS

| | | |
|---|---|---|
| D256,019 S | 7/1980 | Boldt et al. |
| 4,458,126 A | 7/1984 | Dillis et al. |
| 4,702,158 A | 10/1987 | Ishihara |
| 4,980,529 A | 12/1990 | Bolton |
| 5,020,688 A | 6/1991 | Power |
| 5,033,363 A * | 7/1991 | King et al. .................... 99/323.7 |
| 5,035,173 A | 7/1991 | Stein et al. |
| 5,142,114 A | 8/1992 | Briggs et al. |
| 5,254,823 A | 10/1993 | McKee et al. |
| 5,298,707 A | 3/1994 | Sprecher et al. |
| 5,438,183 A | 8/1995 | Hayami et al. |
| 5,501,139 A | 3/1996 | Lee |
| 5,589,093 A | 12/1996 | Chen |
| 5,742,033 A | 4/1998 | Park |
| 5,771,778 A | 6/1998 | MacLean |
| 5,869,817 A | 2/1999 | Zietlow et al. |
| 6,011,249 A | 1/2000 | Chung |
| 6,131,386 A | 10/2000 | Trumble |
| 6,187,353 B1 | 2/2001 | Wyman et al. |
| 6,268,596 B1 * | 7/2001 | Lauf et al. ...................... 219/687 |
| 7,109,448 B2 * | 9/2006 | Goranson ...................... 219/501 |
| 7,908,901 B2 | 3/2011 | Kyle et al. |
| 8,847,131 B2 | 9/2014 | Fang |
| 2004/0031790 A1 | 2/2004 | Kim |
| 2005/0133498 A1 | 6/2005 | Collins et al. |
| 2005/0134469 A1 | 6/2005 | Odorcic et al. |
| 2006/0191918 A1 | 8/2006 | Ashford et al. |
| 2006/0288876 A1 | 12/2006 | Berger et al. |
| 2008/0166457 A1 | 7/2008 | Gorman et al. |
| 2011/0076372 A1 | 3/2011 | Cretors |
| 2011/0088562 A1 | 4/2011 | Korin |
| 2011/0139773 A1 | 6/2011 | Fagrell et al. |
| 2011/0274804 A1 | 11/2011 | Barrows et al. |

OTHER PUBLICATIONS

International Search Report and Written Opinion of the International Searching Authority from PCT Application No. PCT/US2014/22702, dated Nov. 5, 2014.

Wikipedia, "Popcorn", Wikipedia, the free encyclopedia, Mar. 18, 2013 (was known prior to Mar. 11, 2013), en.wikipedia.org/wiki/Popcorn.

D. Kybartas, E. Ibenskis et al.; "Single Mode Circular Waveguide Applicator for Microwave Heating of Oblong Objects in Food Research"; *Electronics and Electrical Engineering*, 2011.No. 8(114) p. 79-82, Kaunas, Lithuania.

Dibben, Christopher David, "Numerical and Experimental Modelling of Microwave Applicators"; Dissertation submitted to the University of Cambridge for the Degree of Doctor of Philosophy, Jun. 1995, University of Cambridge, Darwin College.

Fliflet, Arne W. et al., "Design and Initial Operation of a 6 kW 2.45 GHz Single-Mode Microwave Cavity Furnace," *Naval Research Laboratory* NRL/MR/6793--95/7745; Sep. 1, 1995, United States Navy, Washington, D.C.

"Microwave Chemistry: How it all Works," *CEM Tomorrow's Science Today*, CEM Corporation, 2011 http://cem.com/page130.html.

Metaxas, A.C. et al. "Microwave Heating" Based on an article first published in the *IEE Power Engineering Journal* 5(5) in Sep. 1991.

Akarapu, R. et al. "Integrated Modeling of Microwave Food Processing and Comparison with Experimental Measurements," *Journal of Microwave Power & Electromagnetic Energy*, vol. 39, No. 3 & 4 p. 171-184, 2004; School of Mechanical and Materials Engineering, Department of Bioengineering Systems, Washington State University, Pullman WA.

Gerling, John F. "Waveguide Components and Configurations for Optimal Performance in Microwave Heating Systems," *Gerling Applied Engineering, Inc.* 2000.

Ryynänen, Suvi, "Microwave Heating Uniformity of Multicomponent Prepared Foods," Academic Dissertation. EKT Series 1260. University of Helsinki, Department of Food Technology. 86p. Helsinki, Finland.

Vollmer, Michael, "Physics of the Microwave Oven," *Physics Education* 39(1) p. 74-81, Jan. 2004;IOP Publishing Ltd. www.iop.org/journals/physed.

Lorence et al, Development of packaging and products for use in microwave ovens, 2009, pp. 25-28.

The Great Soviet Encyclopedia, 1979, Centrifuge <Http://encyclopedia2.thefreedictionary.com/centrifuge>.

Spencer Percy, Technology Brief 3: Microwave Ovens, Microwave Absorptions. pp. 1-2.

* cited by examiner

APPARATUS AND SYSTEM FOR POPPING KERNELS

THE FIELD OF THE INVENTION

The present invention relates to novel devices and methods for popping kernels of cereal grains and seeds, such as popcorn.

BACKGROUND

Popcorn is made from un-popped corn kernels by heating the kernels until they "pop." Popcorn kernels have a hard, outer hull that is generally impervious to moisture, while inside the hull the kernel contains starch and proteins with a certain amount of moisture and oil. Heating the kernels turns the moisture inside the hull into a superheated pressurized steam, which causes the starch to gelatinize and pressure to build up in the kernel until the hull ruptures. When the hull ruptures, the pressure quickly drops, allowing the steam to expand. The expanding steam causes the gelatinized starch and proteins inside the kernel to expand into an airy foam, which when cooled sets into the typical popcorn "flake" or "puff."

Early methods for making popcorn involved heating kernels in a basket over an open fire or flame, producing hot, dry, unevenly cooked popcorn. Other methods used oils and fats to aid in heating the kernels, such as in pan frying and frying machines, such as those developed by Charles Cretors in 1885. Later-developed appliances use hot air to heat the kernels and blow the popped kernels out a chute. More recently, standard microwave appliances are used to heat popcorn kernels in a bag containing the kernels and grease or fat.

The above methods have various disadvantages. One common disadvantage to all, however, is that they take too much time to produce suitable quantities of popcorn on demand which results in limited availability, and require advance preparation of large quantities of popcorn which results in product that may not remain fresh. The methods used previously also result in non-uniform heating of the popcorn kernels, resulting in uneven or incomplete popping or kernels and a portion of the hard shell of many kernels remaining un-popped. Although standard multi-mode kitchen microwave devices have been used in the art for popping popcorn, the long processing times also often result in burning of a significant number of popcorn kernels and popcorn flakes, which also affects the taste and aroma characteristics of popped flakes in the same container as the burned kernels and burned flakes. The above considerations add to the processing time, costs of production, loss in efficiency, and quality of end product.

Yet another disadvantage of most method of making popcorn is that a relatively large percentage of the kernels never pop. This results in decreased yield and often results in a person occasionally biting down on an un-popped kernel. Moreover, many consumers of popcorn inadvertently heat popcorn kernels too long, which result in burned popped flakes having toxic levels of heterocyclic amines (HCAs) and polycyclic aromatice hydrocarbons (PAHs) that are potentially carcinogenic. For example, the Ohmy News International Science and Technology website recently published a list of the top 10 carcinogenic foods, with burned popcorn at the top of the list (http://english.ohmynews.com/articleview/article_view.asp?at_code=436169). In addition, recent reports suggest that chemicals present in many microwave popcorn products (to impart flavorings, such as butter flavor), as well as chemicals released from the packaging of microwave popcorn bag itself, are also potentially toxic and carcinogenic.

Improvements in the prior art methods have been subject to certain constraints. The prior art specifically teaches that popping results are sensitive to the rate at which the kernels are heated. For example, the Wikipedia webpage for "Popcorn" teaches that if heated too quickly, the steam in the outer layers of the kernel can reach high pressures and rupture the hull before the starch in the center of the kernel can fully gelatinize, leading to partially popped kernels with hard centers, and, if heated too slowly, leads to entirely un-popped kernels. Because a kernel is not entirely moisture-proof, moisture can leak out of the tip when it is heated slowly, keeping the pressure from rising sufficiently to break the hull and cause the kernel to pop.

The various aspects and embodiments of the present invention, as described below, represent novel improvements on the above devices and methods of the prior art. In addition, the methods and devices of the present invention produce novel popcorn flakes having unexpected and surprisingly lower density and higher popping efficiency (more complete popping with less residual shell remaining).

SUMMARY OF THE INVENTION

The present invention relates to improved systems and devices for producing popped cereal grains and seeds rapidly to provide various improvements over conventional production systems and methods. Various aspects of the invention can be used to produce popped cereal grain and seed flakes more rapidly, having a greater yield in popped kernels and/or having a greater yield in volume, surprisingly without burning the flakes, despite the significantly higher intensity of microwave energy used.

In one aspect, the present invention relates to a microwave device for popping kernels. In one embodiment, the microwave device comprises a heating chamber for containing kernels; a microwave emitter configured to produce microwave energy within the heating chamber; a microwave energy focusing device configured to generate focused microwave energy within the heating chamber and creating a stable microwave high intensity microwave region in the heating chamber; and an air blower for causing movement of the kernels within the heating chamber and causing the kernels to move within the heating chamber. In one configuration, the air blower is configured to move kernels in the heating chamber at a sufficient speed to substantially uniformly heat the kernels. In another configuration, the air blower is configured to circulate kernels within the heating chamber at a velocity greater than 1 revolution per second. The air blower may be any type of air blower, for example, an axial or propeller fan, a centrifugal or radial fan, a turbine, an air compressor, cross-flow fans, combinations of such air blowers, and the like. The moving kernels are subjected to focused microwave energy within the heating chamber, sufficient to more uniformly heat the kernels and cause the kernels to pop.

In another aspect, there is provided an apparatus for popping kernels, comprising: a heating chamber for containing kernels; a microwave emitter configured to produce microwave energy within the heating chamber and heat the kernels; and at least one air blower disposed in communication with the heating chamber for moving kernels within the heating chamber. In one configuration, the apparatus comprises a waveguide for channeling microwave energy into the heating chamber. In another configuration, the heating chamber is within the waveguide. I yet another configuration, the heating chamber is smaller than the microwave wavelength.

In another aspect, there is provided an apparatus for popping kernels, comprising: a heating chamber configured to contain kernels; a microwave emitter configured to produce microwave energy within the heating chamber and heat the kernels; a single-mode resonant microwave applicator configured to generate a stable focused high intensity microwave region within the heating chamber; and an air blower configured to create airflow within the heating chamber sufficient to move the kernels within the heating chamber.

In another configuration, there is provided an apparatus for popping kernels, comprising: a heating chamber for containing kernels; a microwave emitter configured to produce microwave energy within the heating chamber and heat the kernels; a single-mode resonant microwave applicator configured to generate a standing microwave energy field comprising an array of one or more high intensity microwave regions; and a device configured to move kernels within the high intensity microwave regions.

In another configuration, the present invention also provides a popcorn vending machine, comprising: a kernel holding chamber configured to store and dispense kernels; a heating chamber comprising an inlet configured to receive kernels from the kernel holding chamber; a microwave emitter configured to produce microwave energy within the heating chamber and heat the kernels; a single-mode resonant microwave applicator configured to generate a stable focused high intensity microwave region within the heating chamber; at least one air blower disposed in communication with the heating chamber, wherein the air blower is configured to blow air into the heating chamber, thereby moving kernels within the heating chamber and selectively removing popped flakes from the high intensity microwave region when popped; and a heating chamber outlet connected to the heating chamber for receiving popped flakes from the heating chamber and dispensing the popped flakes into a container. In another configuration, the vending machine comprises a dispensing tube connected to the heating chamber outlet, wherein the dispensing tube comprises a ribbed inner surface configured to cause popped flakes to move spirally within the dispensing tube. In another configuration, the ribbed inner surface comprises a helical coil. In another configuration, the ribbed inner surface comprises a plurality of individual rings.

In a vending machine embodiment, the apparatus may also comprise an outlet channel connected to an upper portion of the heating chamber for discharging popped flakes. In another aspect, the vending machine may also comprise a heater for heating the airflow to be passed through the heating chamber. In another configuration, the machine may comprise a control module for controlling the temperature, flow rate, and flow path of the air. In another configuration the machine may comprise a metering system for delivering a specified quantity of kernels to the heating chamber. In another configuration, the machine may comprise a system for adding flavoring to popped flakes. In another configuration, the machine is adapted to be activated by a purchase transaction. In another configuration, the purchase transaction comprises payment by any one or more of a coin, paper bill, plastic charge card, or token. In another configuration, the purchase transaction comprises electronic payment.

In one configuration, the high intensity microwave region includes a microwave energy maxima located within the heating chamber. In another configuration, a single high intensity microwave region is located within the heating chamber. In another configuration, a plurality of high intensity microwave regions are located within the heating chamber. In yet another configuration, the high intensity microwave region excludes a microwave energy maxima located within the heating chamber. In another configuration, a plurality of high intensity microwave regions are located within the heating chamber. In yet another configuration, the high intensity microwave region includes a microwave energy maxima located within the heating chamber. In another configuration, a single high intensity microwave region is located within the heating chamber. In another configuration, a plurality of high intensity microwave regions are located within the heating chamber. In another configuration, the heating chamber has a diameter which is greater than the microwave wavelength. In yet another configuration, the diameter of the heating chamber is such that kernels circulating within the heating chamber pass through a microwave energy maxima of two adjacent high intensity microwave regions. In another configuration, the heating chamber encompasses a perimeter of two adjacent high intensity microwave regions that excludes a microwave energy maxima.

In one aspect, the device is configured such that the heating chamber is between two adjacent microwave energy minima nodes. In various configurations, a sidewall of the heating chamber is positioned such that kernels at a heating chamber sidewall pass through a portion of the high intensity microwave region wherein the energy intensity is at least 50% of the energy maxima, the energy intensity is at least 60% of the energy maxima, the energy intensity is at least 70% of the energy maxima, the energy intensity is at least 80% of the energy maxima, the energy intensity is at least 90% of the energy maxima, or the energy intensity is 100% of the energy maxima. In another configuration, the diameter of the heating chamber is approximately equal to one-half wavelength and the heating chamber is positioned such that kernels at a heating chamber sidewall pass through two adjacent high intensity microwave regions. In another configuration, the diameter of the heating chamber is approximately equal to one-half wavelength and the heating chamber is positioned such that kernels at a heating chamber sidewall pass approximately through the energy maxima of two adjacent high intensity microwave regions. In another configuration, the apparatus comprises a plurality of anti-node high intensity microwave regions. In another configuration, the heating chamber encompasses a plurality of high intensity microwave regions and wherein the blower is configured to rapidly move the kernels through the high intensity microwave regions. In another configuration, the apparatus comprises a plurality of heating chambers, wherein substantially all of each of the one or more high intensity microwave regions is located within one of the plurality of heating chambers. In another configuration, the single-mode resonant microwave applicator is configured to generate microwave intensity within the heating chamber to subject the kernels to microwave energy sufficient to pop one or more of the kernels within approximately 10 seconds. In another configuration, the device comprises two or more microwave energy sources such that the two or more microwave energy sources constructively interfere at approximately the same location within the heating chamber.

In accordance with one aspect of the invention, the apparatus comprises an airflow input and an airflow outlet and the air blower causes airflow to pass in the airflow input, through the heating chamber, and out of the airflow outlet. In another aspect, the air blower is configured to cause airflow within the heating chamber in a horizontal direction sufficient to move kernels in a generally horizontal and generally circular path in the heating chamber. In another aspect, the apparatus comprises an air input in the side of the heating chamber, wherein the horizontal airflow comprises airflow input into the heating chamber from the side of the heating chamber at an angle generally tangential to the heating chamber. In another aspect, the air blower may be one or more blowers for creating an airflow pattern within the heating chamber to thereby move the kernels. In one configuration, the heating chamber is generally cylindrical in shape and the air blower is configured to cause airflow within the heating chamber in an approximately circular path and move the kernels horizontally within the heating chamber in an approximately circular path. In another configuration, the air blower is configured to cause airflow within the heating chamber in a vertical direction, from a lower portion of the heating chamber upwardly to an upper portion of the heating chamber. This may include an airflow which starts generally horizontally to cause the kernels to move in a generally circular direction within the heating chamber. The airflow may also be configured to form a helical movement path so that it causes the kernels to move generally circularly within the heating chamber and then moves upwardly in a helical or spiral configuration to carry popped flakes out of the heating chamber. In the alternative, two air flow paths could be used with one being more vertical. In another configuration, the air blower is configured to cause the vertical airflow at a rate sufficient to selectively move popped flakes out of the heating chamber when popped as a result of the increased drag of the popped flakes. In another configuration, the air blower is configured to create airflow in both a vertical direction and a horizontal direction.

In another aspect of the invention, airflow may be directed from two different sources to create a desired movement pattern for kernels prior to and after popping. One pattern may be configuration to provide substantially circular airflow of the kernels prior to popping while the other may be configured to lift popped flakes from the heating chamber. Alternatively, a single airflow source may be provided to perform both functions.

In accordance with another aspect of the invention, the kernels may be moved within the high intensity microwave region by means of a rotating heating chamber, such as a spinning cup, which causes the kernels to circulate with the heating chamber while they are subjected to microwave energy. In one configuration, the spinning cup has sides that are outwardly sloping. In another configuration, the spinning cup has an internal flange forming a lip, wherein the lip prevents unpopped kernels from escaping the spinning cup, but allows a popped flake to escape the spinning cup. In yet another configuration, the heating chamber comprises a spinning cup that is configured to move kernels within the high intensity microwave regions.

In accordance with one aspect of the invention, a heating element may be used to heat air passing into the heating chamber. The air being blown into the airflow chamber may, for example, between ambient room temperature of 20° C. to 232° C., or alternatively from about 70° C. to about 180° C., or alternatively from about 80° C. to about 95° C.

In accordance with yet another aspect of the invention, a heat source for preheating the one or more kernels prior to being disposed within the heating chamber may be used. The heat source may be, for example, one or more of a flame, infrared heat and convection heat.

In another aspect, the present invention involves a heating chamber for containing kernels and a single-mode resonant microwave applicator for generating a standing microwave energy field comprising an array of one or more anti-node high intensity microwave regions. The kernels are subjected to the microwave energy in the one or more high intensity microwave regions, sufficient for the kernels to achieve a substantially uniform distribution of heat to cause the kernels to pop.

In accordance with another aspect of the invention, a microwave device is provided for popping cereal grain and seed kernels includes a microwave energy source; a single-mode resonant waveguide applicator wherein the waveguide is configured to focus microwave energy from the microwave energy source at one or more regions within the waveguide; a heating chamber for heating kernels, and an outlet in communication with the heating chamber for discharging popped flakes; and at least one air source for circulating air within the lower portion of the heating chamber and for passing air from the lower portion of the heating chamber to the upper portion of the heating chamber.

In accordance with another aspect of the invention, the improved system and method of making popped flakes heats kernels with microwave electromagnetic radiation by creating high intensity microwave regions within a heating chamber. The kernels are heated in the high intensity microwave regions until they pop into flakes. During the process, airflow passes through the heating chamber from a lower portion of the chamber to an upper portion of the chamber. The airflow blows the popped flakes out of the heating chamber as a result of the increased drag coefficient of the larger irregularly shaped popped popcorn, while allowing the smaller more uniformly shaped un-popped kernels to remain in the chamber until they eventually pop.

In one aspect, the present invention also contemplates novel methods for making popped cereals. In another aspect, the present invention comprises a method of popping kernels, comprising moving kernels within a heating chamber with airflow; and subjecting the kernels to focused microwave energy sufficient to cause the kernels to pop, resulting in popped flakes. In yet another aspect, the present invention comprises a method for popping kernels, comprising generating a standing microwave energy field in a single-mode resonant microwave applicator, wherein the standing microwave energy field comprises an array of one or more high intensity microwave regions; and subjecting kernels to the microwave energy in the one or more high intensity microwave regions, sufficient to cause the kernels to pop and produce popped flakes.

In one embodiment, a method is provided that comprises the steps of passing electromagnetic microwave radiation through a heating chamber and maintaining at least one anti-node of at least one microwave at a fixed location within the heating chamber. The kernels are heated with the microwave radiation at approximately the location of the one or more anti-node.

In another aspect, the present invention provides a method of popping kernels, comprising moving kernels within a heating chamber with airflow; and subjecting the kernels to microwave energy sufficient to cause the kernels to pop, resulting in popped flakes. In one embodiment, the microwave energy is focused microwave energy.

In yet another aspect, the present invention provides a method for popping kernels, comprising generating in a single-mode resonant microwave applicator a standing microwave energy field comprising an array of one or more anti-node high intensity microwave regions, and subjecting kernels to the microwave energy in the one or more high intensity microwave regions, sufficient for the kernels to achieve a substantially uniform distribution of microwave energy heat to cause the kernels to pop.

In yet another aspect, the present invention provides a method for popping cereal grain and seed kernels, comprising generating in a single-mode resonant microwave applicator a standing microwave energy field comprising an array of one or more high intensity microwave regions; providing a heating chamber encompassing the one or more high intensity microwave regions; delivering kernels to the heating chamber, wherein the kernels are moved through the microwave high intensity microwave region within the heating chamber to achieve a highly uniform distribution of microwave energy heat until popped; and selectively discharging popped flakes from the heating chamber by upward airflow.

In one aspect, the present invention includes the heating chamber being smaller than the wavelength of the microwave energy being passed through the heating chamber, such that the kernels can circulate around and through the high intensity microwave region located within the heating chamber. In one particular embodiment, the diameter of the heating chamber is between about 1.75 inches (4.45 cm) and about 3 inches (7.62 cm). In another embodiment, the diameter of the heating chamber is between about 2 inches (5.08 cm) and about 2.5 inches (6.35 cm). The small diameter of the heating chamber subjects the popcorn to a high dose of microwave energy, causing it to pop rapidly. Movement of the popcorn within the heating chamber makes the popcorn kernel heat evenly, allowing the starch in the center to gelatinize prior to rupture of the hull. Thus, the present invention allows for rapid popping without drawbacks identified in the art.

In another aspect, the single-mode resonant microwave applicator generates a standing microwave pattern comprising an electric field distribution of n half-wavelengths, where n is an integer. This may include where n is greater than 1.

In one aspect, the present invention may include a plurality of heating chambers. The microwave energy may be channeled such that each heating chamber as a high intensity microwave region disposed therein and so that the corn moves within the high intensity microwave region.

In one aspect, the single-mode resonant microwave applicator may be configured to generate microwave energy at a frequency from between approximately 800 MHz and 30 GHz. In some aspects, the microwave frequency is from between approximately 1 GHz to 5 GHz. In more typical applications, the microwave frequency is from between approximately 2 GHz to 3 GHz. Many commercial microwaves use microwave frequency at about 2.54 GHz.

In accordance with one aspect of the present invention a single-mode resonant microwave applicator may be configured to generate microwave intensity within the heating chamber to subject the popcorn kernels to microwave energy sufficient to pop one or more of the popcorn kernels within approximately 10 seconds. An entire load of kernels may be popped in less than 30 seconds, or even in less than 20 seconds.

In one aspect, the present invention may include a device with two or more microwave energy sources such that the two or more microwave energy sources constructively interfere at approximately the same location within the heating chamber.

In another aspect, the present invention may include a device for continuously feeding kernels into the heating chamber.

In another aspect, the present invention provides novel popcorn flakes having significantly lower density, and improved popping efficiency.

The present invention further provides popcorn flakes having an average volume equal to or greater than about 900 mL per 100 flakes, 903 mL per 100 flakes, 908 mL per 100 flakes, 912 mL per 100 flakes, 917 mL per 100 flakes, or 928 mL per 100 flakes. In another aspect the invention provides popcorn flakes having a volume equal to or greater than about 833 mL per 100 flakes, 917 mL per 100 flakes, 958 mL per 100 flakes, or 1000 mL per 100 flakes.

In another aspect, the present invention provides a method of popping kernels, comprising moving kernels within a heating chamber with airflow; and subjecting the kernels to focused microwave energy sufficient to cause the kernels to pop, resulting in popped flakes, wherein the method produces popped flakes with an average popping yield greater than 94%, greater than 95%, greater than 96%, greater than 97%, or greater than 98%. In yet another aspect, the invention provides a method for popping kernels, comprising: generating in a single-mode resonant microwave applicator a standing microwave energy field comprising an array of one or more anti-node high intensity microwave regions; subjecting kernels to the microwave energy in the one or more high intensity microwave regions, sufficient for the kernels to achieve a uniform distribution of microwave energy heat to cause the kernels to pop, wherein the method produces popped flakes with an average popping yield greater than 94%, greater than 95%, greater than 96%, greater than 97%, or greater than 98%

These and other aspects of the present invention are realized as shown and described in the following figures and related description.

BRIEF DESCRIPTION OF THE DRAWINGS

Various embodiments of the present invention are shown and described in reference to the numbered drawings wherein.

Figure 1A:
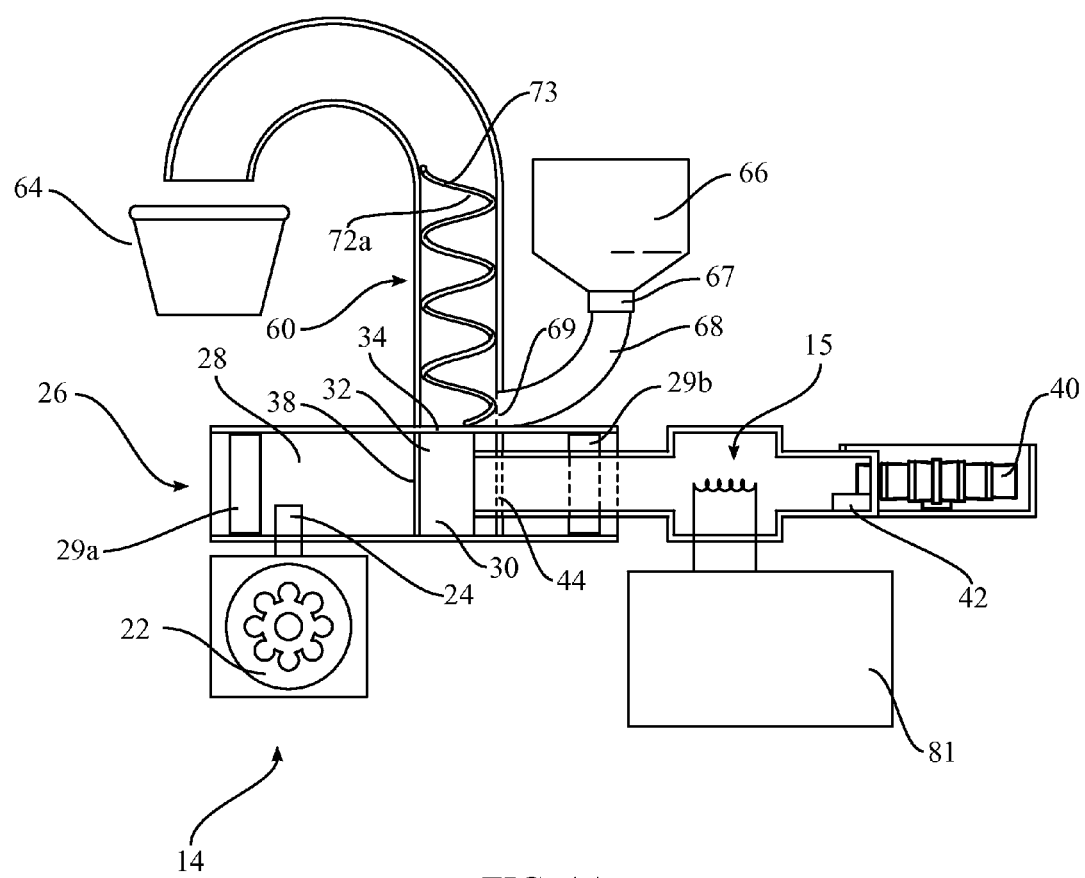
FIG. 1A shows a side view of an apparatus for popping popcorn in accordance with the principles of the present invention.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

There is thus disclosed improved systems, devices and methods for making popcorn flakes. Moreover, it will be understood that references in the following disclosure to systems and devices are also applicable to methods, which utilize related structures for the processes recited. Similarly, references to methods are also applicable of systems and devices, which perform the processes in the operation of the recited devices. It will be appreciated that numerous changes may be made to the present invention without departing from the scope of the claims.

As used herein, the following terms have the meaning set forth below:

The term "kernel" means any one or more of several varieties of cereal grain or seed having a sufficiently hard moisture-sealed exterior hull and dense starchy interior that it is capable of being popped or puffed to form irregularly shaped flakes when heated. Suitable cereal grains and seeds capable of being popped include, for example, corn (popcorn), amaranth, sorghum, quinoa and millet. Although the specification herein refers frequently to "popcorn" cereals, as exemplary grain/see kerenels, it is understood that the various apparatus, device and method embodiments described herein may be used for popping cereals grains and seeds other than popcorn and that the scope of the claims referring to a "kernel" or "kernels" encompasses all such varieties of cereal grains/seeds capable of being popped, and shall not be limited by any particular references in the specification to "popcorn."

The term "flake" means a kernel that has been heated and popped. Similarly, the term "popped" refers to a kernel that has been heated sufficient to cause the cereal grain or seed to puff into a flake.

The term "focused microwave energy" means microwave energy that has been directed or focused into a defined area, resulting in a substantially stable and homogeneous field pattern surrounding the load being subject to the microwaves. Focused microwave energy may be generated, for example, by reflecting microwaves in a multi-mode microwave applicator having multiple resonant modes of microwave energy propagation, or by generating a standing wave pattern in a single resonant mode (i.e., single-mode) microwave applicator, where the standing microwave pattern generates microwaves that constructively interfere to generate stable areas of high intensity microwave energy.

The term "high intensity microwave region" means a region of focused microwave energy in a microwave applicator, wherein the microwaves are of sufficiently high intensity to cause rapid heating and popping of cereal grains and seeds. A high intensity microwave region typically includes the location of maximum energy intensity. Although a high intensity microwave region may encompass the location of energy maxima, it does not necessarily include the point of energy maxima. Because, in a single-mode resonant microwave applicator, the energy intensity varies sinusoidally from the energy minimum (the node, where electro-magnetic waves destructively interfere) and the energy maximum (the antinode, where the electro-magnetic waves constructively interfere), a high intensity microwave region may also encompass the region of energy intensity that is less than the energy maximum while excluding the actual location of energy maximum. A heating chamber may encompass two high intensity microwave regions, without encompassing the points of energy maxima, where the perimeter of the heating chamber (i.e., the sidewalls) passes through the region between the two energy maxima without actually passing through the energy maxima. Accordingly, a "high intensity microwave region" shall be construed to comprise those locations having a microwave energy greater than the microwave energy minima and having a stable well-defined microwave energy maxima.

The term "single-mode," as used in reference to microwave applicators herein, means that the superposition of incident and reflect waves in a resonant cavity results in a standing wave pattern with a single resonant mode of microwave energy, thereby generating high intensity microwave regions containing energy maxima that are stable at well-defined and predictable positions within the applicator. In contrast, traditional multi-mode microwave applicators propagate microwaves with multiple modes of energy, each with varying intensity and at irregularly spaced intervals. A single-mode resonant microwave applicators establish significantly higher electric field strengths compared to a traveling wave or a multi-mode applicator, and are generally more compact, as the dimensions of the resonant cavities are a function of the wavelength typically used for microwave heating (2.45 GHz) of food articles. The particular size and dimensions of a single-mode microwave applicator can be determined by those skilled in the art of microwave heating, by utilizing Maxwell equations, which contain all the necessary parameters needed to define the standing wave pattern desired to be established in a particular case, including the geometry and dimensions of a resonant waveguide applicator operating in single-mode.

The term "popping yield" means the percentage of popcorn kernels that are popped, as determined by popping at least 8 batches of popcorn kernels with 60 kernels in each batch, to produce popcorn flakes, calculating the percentage of kernels in each batch that produce popped popcorn flakes, and averaging the percentage of kernels in the 8 batches that produce popped popcorn flakes.

The term "volume," as used herein in reference to the volume or average volume of popped flakes, means the volume of a quantity of flakes, as determined by popping at least 8 batches of kernels, with 60 kernels in each batch, to produce popped flakes, placing the popped flakes in a 1000 mL graduated cylinder, placing the cylinder on a cushioned surface and tapping the top of the cylinder lightly by hand 6 times and measuring the volume (repeating as many times as necessary until any changes in volume are not statistically significant), and then determining the final volume. The average volume is calculated by averaging the final volume of at least 8 batches.

It is further understood that use of definite articles such as "the" or "a" shall be construed to include one or more elements and shall not be construed to be limited to a single element. Elements shall be limited to single elements only if expressly modified by a term such as "single," "one," "sole," "only," or the like.

The present invention generally relates to novel devices and methods for popping cereal grain and seed kernels which may achieve a variety of desired outcomes, such as increased popping speed, increased yield, reduced density, a change in general popcorn flake structure, and other outcomes discussed herein. The novel devices and method may utilize focused microwave energy to create a high intensity microwave field density that more uniformly heats kernels at a high rate to cause the kernels to achieve a critical heating temperature simultaneously and thereby pop more completely, with less residual popcorn shell remaining. Although the use of multi-mode microwave devices have been used in the art for popping kernels, the present invention relates to the discovery that focused microwaves, such as single-mode microwave applicators, may result in improved popping efficiency of kernels, as well as improved speed of popping. In addition, the focused microwaves may result in improved popped flakes having lower density, larger size, higher popping efficiency and improved taste characteristics.

The devices and methods described herein confer significant advantages over the prior art, including, for example, providing devices that are significantly smaller in size, which enables ease of storage and improved portability, and consume significantly less energy. For example, such devices may be used to provide food for emergency humanitarian aid, disaster relief or military purposes, where there is a need to produce high volumes of nutritional food, inexpensively, in remote locations where there may be no significant energy infrastructure. The portability of the devices disclosed herein may also be a significant advantage where there is a demand for large quantities of popcorn at entertainment venues, as the devices enable high volume output of fresh product, and avoid the need of advance production of popcorn that may not be fresh and that requires popping off-site and transportation to the venue. As disclosed in more detail herein, the popcorn flakes produced by the devices and methods disclosed herein are also novel in that they have a higher volume (lower density), improved popping yield (resulting in more of the hard kernel being puffed into an edible product, with less residual shell), improved texture and mouth-feel, as well as improved molding ability (resulting from residual moisture causing the popped flakes to have increased gumminess that allows popped flakes to stick together better immediately following popping of the flakes).

While various embodiments implementing different aspects of the present invention are discussed below, it has been found in accordance with the principles of the present invention that multiple advances may be achieved in the popping of kernels. For example, in accordance with aspects of the invention it has been found that improvements in popping kernels can be achieved by placing kernels in a heating chamber disposed within a within a single high intensity microwave region, i.e. the chamber closely surrounds or encompasses the area of peak energy of a standing microwave signal. As the kernels move within the high intensity microwave region, the kernels are able to heat rapidly, thereby causing the kernels to heat and rupture in a much shorter period of time than conventional oil, air and microwave popping systems currently available. Additionally, all of the kernels are subject to a substantially equal amount of heat, and the heating within each kernel may be generally more uniform than conventional methods. This results in kernels popping more rapidly and may result in both a significantly higher yield in the number of kernels popped and in the average volume of the kernels which have popped.

As shown in the Example section below, tests were conducted to compare the methods and systems of the present invention with methods known to those in the art, including hot air popping and microwave bag popping. In this comparison, the methods and systems of the present invention showed significant improvements in popping time, popping efficiency (the percentage of kernels that actually popped), and increased flake volume which results in improved texture and mouth feel.

Based on the above testing results, the present invention significantly improves popping time. Using a hot air popper (which is known in the art), popping with a load of 60 popcorn kernels started within 34-61 seconds (on average 48 seconds) and was completed within 55-109 seconds (on average 78 seconds). Similarly, using a standard kitchen microwave bag, popping started within 65-73 seconds (on average 69 seconds) and was completed popping within an average of 189 seconds. In contrast, using a high intensity microwave device, in accordance with the present invention, popping started and was completed within significantly shorter periods—initial popping of 60 kernels started within as little as about 9-12 seconds (on average within about 10 seconds), while popping was completed within 16-19 seconds (on average within about 17 seconds). Thus, the methods and systems of the present invention provide a significant improvement in the time it takes of initiate and finish popping a batch of popcorn kernels, showing a reduction in the average time of over 78%.

Not only do the systems and methods of the present invention pop the kernels faster, it has been found that the yield is also significantly higher. For example, conventional systems for popping kernels (hot air and microwave bags) result in popping an average of 89-93% of all kernels (with individual batches ranging from 75-97%). The remaining kernels are ejected out of the popper either by the airflow, are carried with popped kernels as they are expelled, or simply remain unpopped inside the microwave bag. The tests reported below showed that the methods and systems disclosed and claimed herein result in an average popping yield of 98%, with individual batches being as high as 98%, 99% and even 100% for some batches. Thus, the methods of systems of the present invention produce a significantly greater average yield.

In addition, the rapid heating and rupturing of the kernels in accordance with the present invention resulted in popped flakes which were of larger volume than those popped by the conventional methods. In the tests described below, the volume of multiple batches of 60 popped flakes, using conventional hot air and microwave bag methods and focused microwave methods disclosed herein, were compared. These tests showed that the methods of the present invention resulted in an average increase in volume of popped flakes of about 13% compared to kernels popped in a microwave bag, and over 30% increase in volume compared to kernels popped with a hot air popper. Accordingly, the methods and systems of the present invention provide significant improvements to the size of popped flakes, which results in improved texture and mouth feel of the popped flake.

It has also been discovered that the use of high intensity microwaves in accordance with the present invention result in a significant reduction in power consumption. For example, a typical hot air popper consumes over 26 W-hours of energy (1200 W for 78 seconds to cook 60 kernels) and a standard kitchen microwave consumes approximately 14 W-hours of energy for a 3.5 oz bag of microwave popcorn (1500 W for 189 seconds for 342 kernels, normalized for 60 kernels). In contrast, the use of a focused microwave device in accordance with the present invention consumes only 9 W hours of energy (2000 W for 17 seconds for 60 kernels). The methods and devices of the present invention further result in significant reduction in energy consumption and cost savings, amounting to approximately 35%.

Finally, the methods and devices of the present invention also result in a significant reduction or elimination of burned flakes. The popped flakes made by the methods and devices of the present invention, when compared to popped flakes made by methods and devices previously used (such as standard kitchen microwave devices), show significant reduction in burned, charred and darkly colored areas which could potentially be toxic or carcinogenic.

Systems and Devices

The basic configuration of the systems and devices of the present invention comprises a microwave emitter, such as a magnetron, connected to a microwave antenna for emitting microwave energy into a heating chamber. The systems and devices may include a waveguide cavity or microwave focusing device, such as a single-mode resonant cavity, within which a heating chamber is located. The purpose of the microwave cavity and associated hardware is to maximize the electric field at the load (the kernels) and optimize the microwave coupling efficiency. The microwave applicators of the present invention may generate high intensity microwaves within the heating chamber to subject the kernels to microwave energy sufficient to pop one or more of the kernels.

Figure 1B:
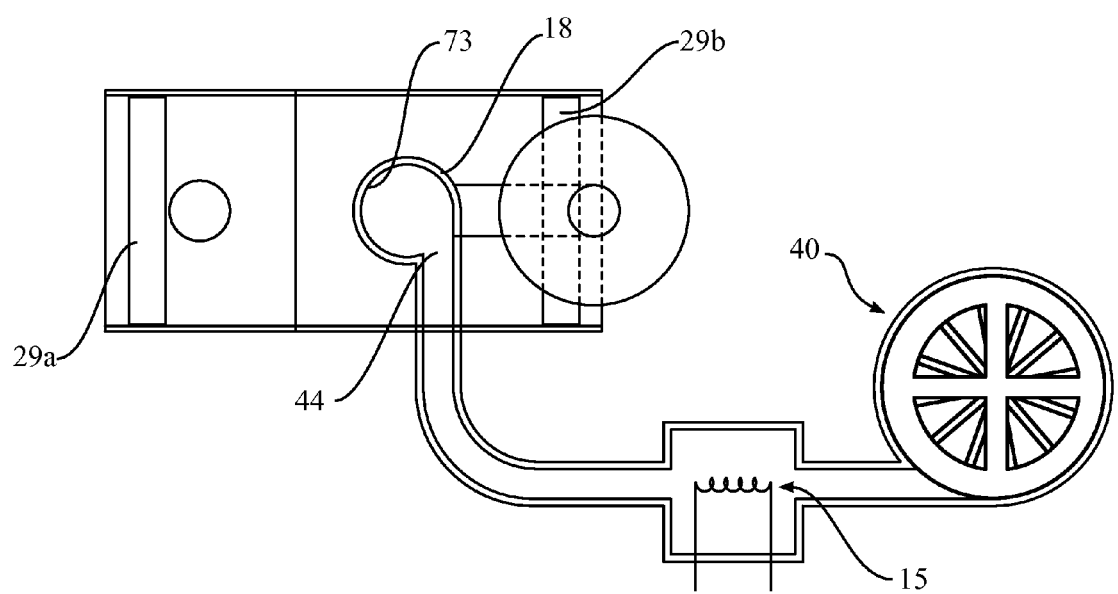
FIG. 1B shows a top view of the apparatus of FIG. 1A.
Figure 1C:
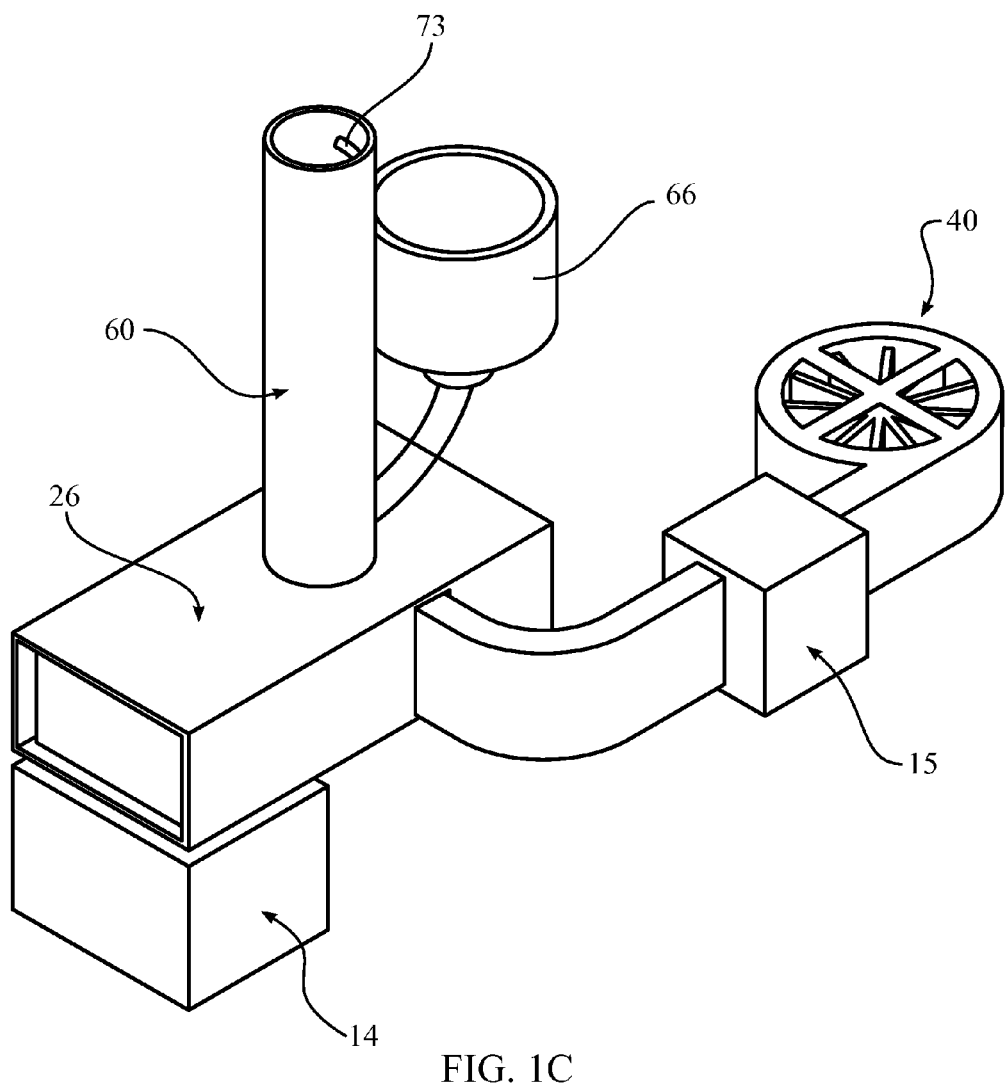
FIG. 1C shows a perspective view of the apparatus of FIG. 1A.
Figure 1D:
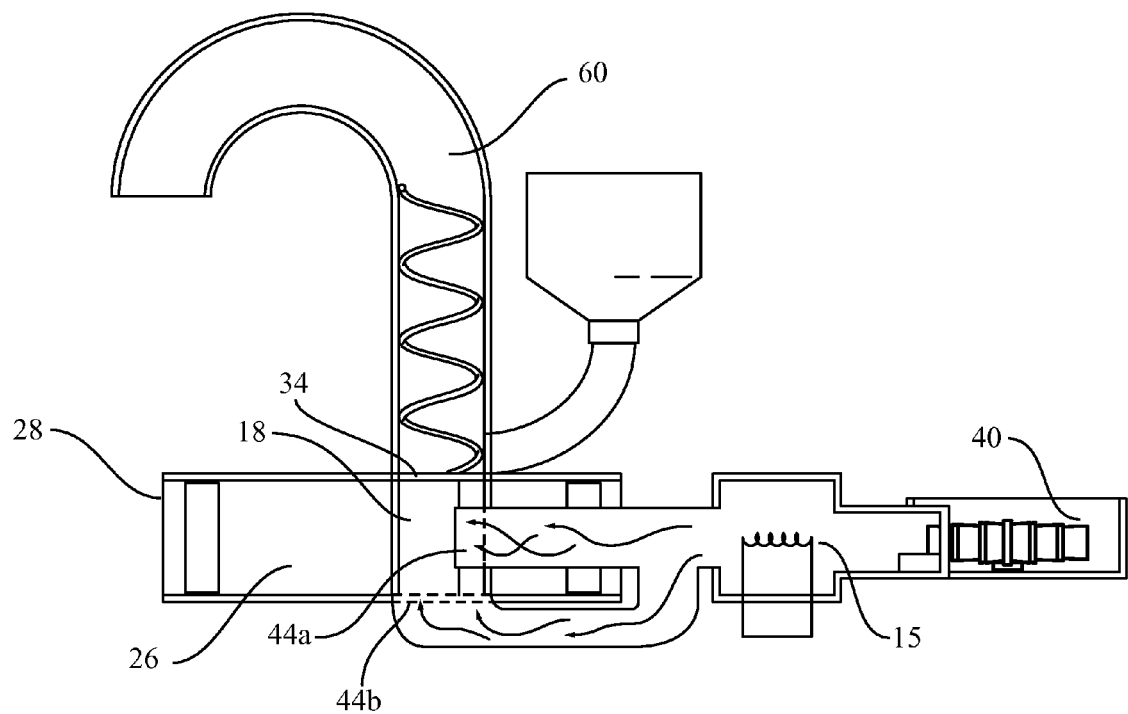
FIG. 1D shows a view of an air blower and the heating chamber having two separate air inputs into the heating chamber from a single blower.

One embodiment of a system for making popped flakes in accordance with the present invention is shown in FIGS. 1A-C. A kernel popping system, generally indicated at 10, may include a microwave energy emitter 14 for producing microwave energy within a heating chamber 18. Appropriate microwave energy emitters 14 are known and may be selected according to various design considerations known to those skilled in the art and determined without undue experimentation. Microwave energy emitters typically comprise a magnetron 22 for generating microwaves and a magnetron antenna 24 disposed within a waveguide 26. The waveguide 26 directs microwave energy within a microwave cavity 28 defined by the waveguide to the load (such as popcorn kernels, not shown) that is disposed within the heating chamber 18.

The magnetron 22 may generate microwave energy at any frequency suitable for heating grains or cereals having some water content. Generally, grains or cereals may be heated with microwaves at a frequency ranging from 1 MHz up to 30 GHz. The range of frequencies more commonly used is from about 400 MHz to about 20 GHz. The ISM bands commonly used for industrial, scientific and medical uses (including heating/cooking food products), as prescribed by certain government regulatory agencies, include 896 MHz, 915 MHz and 2.45 GHz. For example, in some embodiments, the magnetron is tuned to generate microwave energy at a frequency that maximizes the rapid oscillation of water molecules in the load being heating, such as 2.45 GHz. As will be apparent to those skilled in the art, other operating frequencies may also be used effectively. The present invention contemplates use of microwave energy at any frequency suitable for popping kernels.

The selection of appropriate microwave generators is considered to be within the ordinary skill in the art. It is understood that typical microwave generators utilize magnetron oscillators, which may include continuous wave generators to produce a relatively narrow output frequency spectrum for use with small loads, as in the case of small batch volumes of kernels.

Microwave Focusing Device

The present invention employs focused microwaves as a means of creating high intensity microwave energy for rapid high-temperature popping of cereal grains and seeds. Microwave energy may be focused, for example, by reflecting microwaves in a multi-mode applicator so as to create a stable and homogeneous "high intensity microwave region" (defined below) at defined location, such as a small heating chamber suitable. Alternatively, microwave energy may be focused through use of adaptive microwave phased arrays to concentrate the microwave energy at a predetermined area. For example, suitable adaptively focused microwave systems may be constructed having a phased array of multiple radiating antenna elements for a tightly focused microwave beam having a maximum dimension on the order of 2-10 cm or larger, as described by Fenn A J, *Adaptive Antennas and Phased Arrays for Radar and Communications*, Norwood, Mass., Artech House Publishers, 133-160 (2008). Alternatively, microwave energy may be focused by use of a single-mode microwave applicator, which generates a stable standing wave pattern having one or more "high intensity microwave region" of energy maxima. Other techniques and devices for focusing microwaves are also contemplated to be within the scope of the present invention.

In accordance with the present invention, one particular microwave energy focusing device is shown in FIG. 1A-1C. A microwave energy focusing device of the present invention, may comprise a waveguide 26, which includes a microwave cavity 28 within which a heating chamber 18 containing popcorn kernels is located. The microwave energy focusing device provides for high intensity focused microwave energy within the heating chamber and creates one or more stable evenly-spaced microwave anti-node high intensity microwave regions in the heating chamber as shown and discussed in additional detail with respect to FIGS. 2, 3, 4, and 5. The length and shape of the waveguide 26 may be configured to create standing waves such that high intensity microwave energy regions (i.e., microwave energy maxima) are evenly spaced at fixed locations. These high energy regions are referred to herein as "high intensity microwave regions."

The use of focused microwaves may be achieved by any one of several approaches. For example, in one embodiment, microwave energy may be focused by reflecting microwaves from a shaped surface that is highly reflective of microwave energy, so that radiation emitted from the microwave source is reflected towards the heating chamber containing the popcorn kernels. Microwaves may be focused by reflecting off a surface such as a parabolic dish, a horn antenna, a hemispherical dome, etc. Alternatively, microwaves may be focused by means of a microwave lens.

Figure 2:
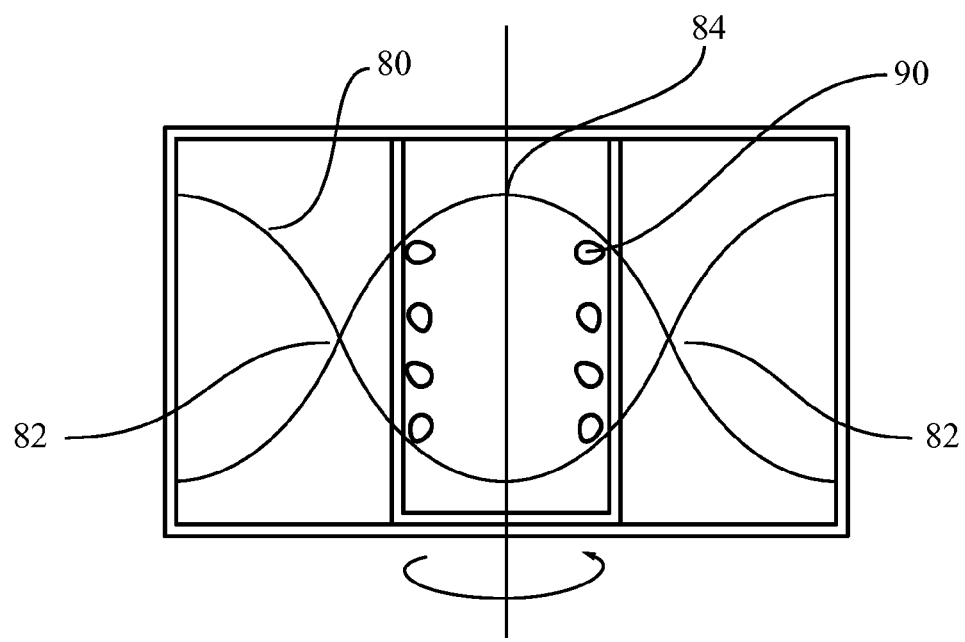
FIG. 2 is a diagram of a microwave energy pattern and a heating chamber encompassing a single high intensity microwave region.
Figure 3:
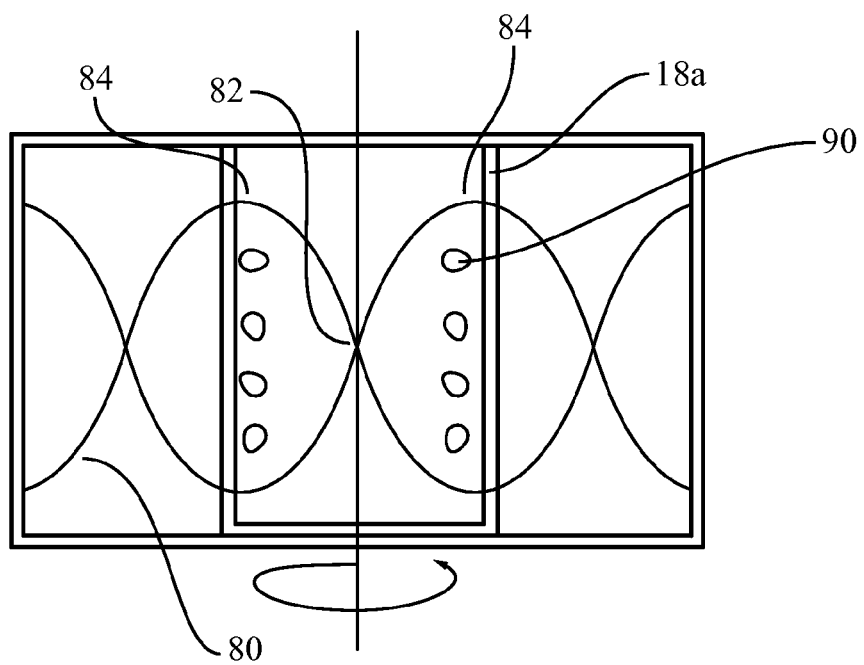
FIG. 3 shows a diagram of a microwave energy pattern and a heating chamber encompassing two high intensity microwave regions.
Figure 4:
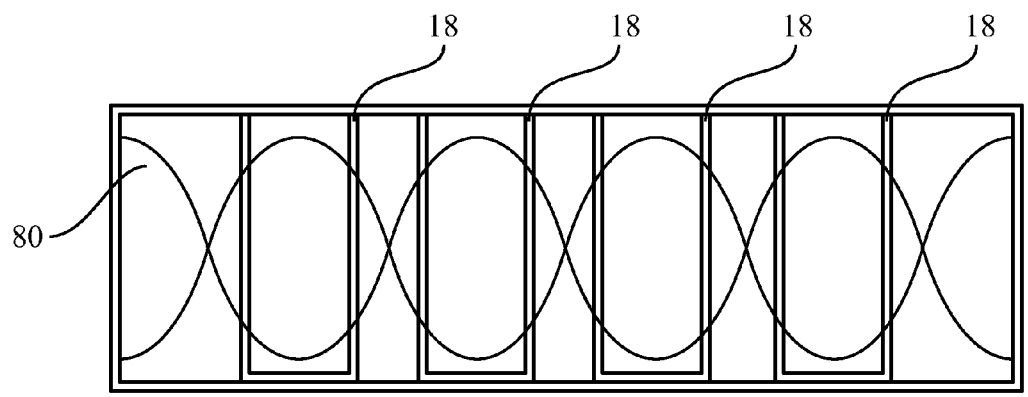
FIG. 4 shows a diagram of a microwave energy pattern with a plurality of heating chambers, each positioned within a high intensity microwave region.

In other embodiments, the focused microwaves may be achieved by use of a single-mode resonant microwave applicator. A single-mode resonant microwave applicator has the ability to create a standing wave pattern, which is generated by the interference of fields that have the same amplitude but different oscillating directions. This interface generates an array of nodes where microwave energy intensity approaches zero, and an array of antinodes where the magnitude of microwave energy is at a maximum. Single-mode resonant applicators are designed so that the distance of the sample from the magnetron is such that the sample can be placed at the anti-nodes of the standing electromagnetic wave pattern. Single-mode resonant applicators may be designed such that the standing electromagnetic wave pattern generates an array of one or more anti-node high intensity microwave regions where the magnitude of microwave energy is at a maximum. As shown in FIGS. 2, 3, and 4, these anti-nodes are generated at evenly spaced intervals (where there is a plurality) and are sufficiently stable and localized that a load can be accurately placed within the anti-node high intensity microwave region with predictable and repeatable results.

In some embodiments, the single-mode resonant microwave applicator may include a shorted rectangular waveguide cavity 28 comprising a metal tube having a generally rectangular cross section and one or more short-circuit wall 29a and 29b at one or more end of the metal tube, as shown in FIG. 1A.

Figure 6:
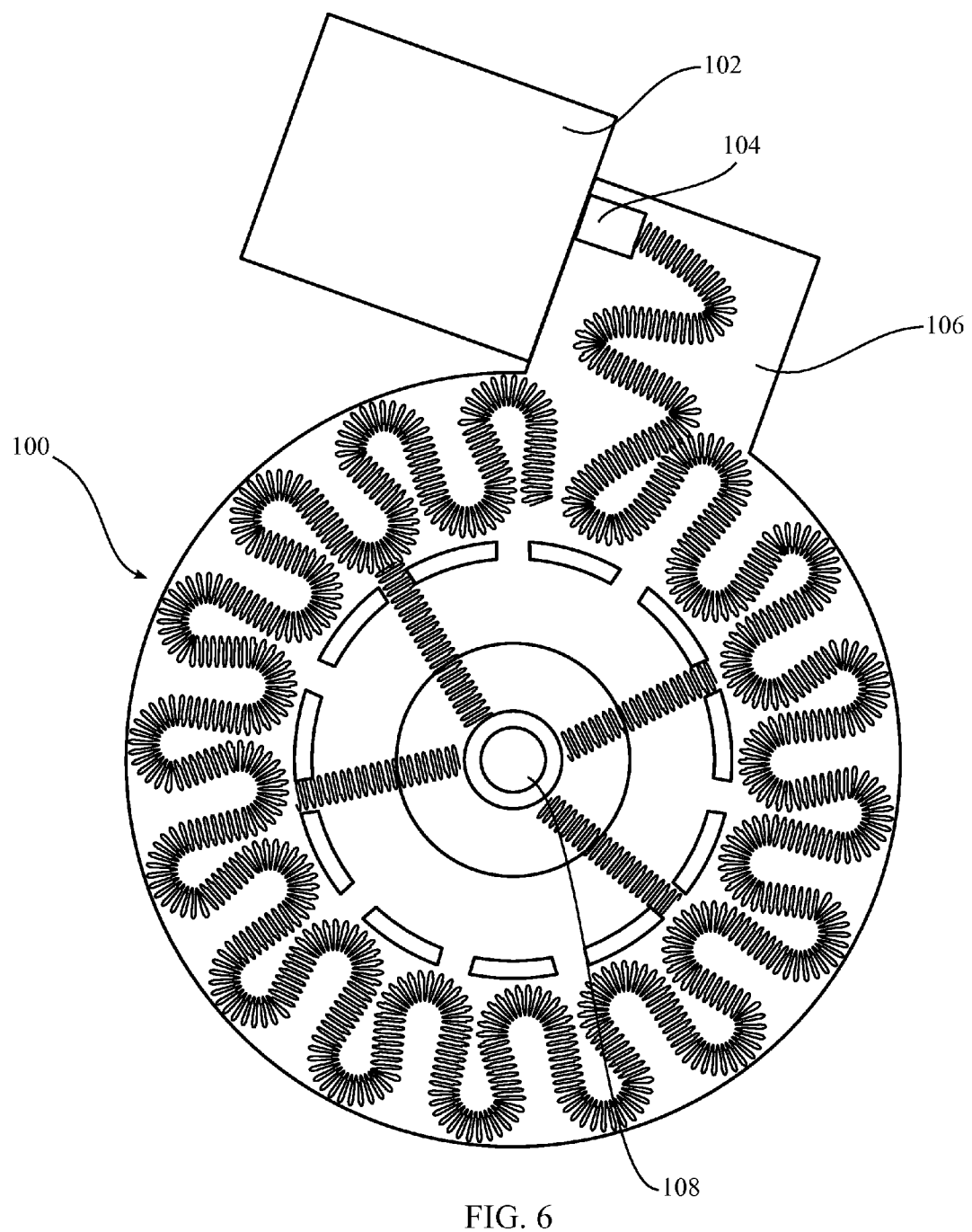
FIG. 6 shows an alternative single-mode microwave circular waveguide applicator for popping kernels.

It is contemplated that single-mode resonant microwave applicators may also be constructed of tubular or circular waveguides. In another embodiment, the microwave focusing device may be circular self-tuning single-mode resonant cavity, as shown in FIG. 6 (made by CEM Corporation, Matthews, N.C.). In a single-mode resonant microwave applicator, the superposition of the incident and reflected waves establish a standing wave pattern that is stable, well-defined in space, has evenly and predictably spaced positions of energy maxima. These features enable a dielectric material, such as popcorn kernels, to be placed in one or more localized positions of maximum energy or concentrated electric field (referred to, herein, as a "high intensity microwave region") for optimum transfer of the electromagnetic energy to the dielectric material. In some embodiments, the single-mode resonant microwave applicator generates a standing microwave pattern comprising an electric field distribution of n half-wavelengths, where n is an integer. In some embodiments, n is greater than 1. In some embodiments, n=1, 2, 3, 4, 5, 6, 7, 8, 9 or 10, or greater.

In some embodiments, the single-mode resonant microwave applicator may be configured to generate a plurality of anti-node high intensity microwave regions. In some embodiments, as shown in FIG. 2, at least one of the one or more high intensity microwave regions is located within the heating chamber. In other embodiments, the heating chamber encompasses a single high intensity microwave region. In other embodiments, such as shown in FIGS. 3 and 4, the heating chamber encompasses a plurality of high intensity microwave regions. For example, as shown in FIG. 4, the device may comprise a plurality of heating chambers, wherein each high intensity microwave region is located within a single heating chamber. FIG. 3 shows an embodiment in which a single heating chamber spans two adjacent high intensity microwave regions.

In some embodiments, the device may include two or more microwave energy sources such that the two or more microwave energy sources constructively interfere at approximately the same location within the heating chamber.

Those skilled in the art understand that the choice of waveguide size depends on such considerations as operating frequency, power rating, component availability and cost. Various waveguide sizes commonly used for industrial microwave heating include 2450 MHz (S band) and 915 MHz (L band) include. For example, a WR284 (7.21 cm×3.40 cm) waveguide is often the preferred choice for 2.45 GHz operation at average power levels of up to 6 kW. Waveguides may be made of such materials as aluminum, copper, or stainless steel.

The length of such waveguides may vary, depending on the number of high intensity microwave regions desired in the waveguide. Microwave waveguide cavities may be designed to support any one of various $TE_{10}$ rectangular waveguide resonant modes, including $TE_{101}$, $TE_{102}$, $TE_{103}$, $TE_{104}$, $TE_{105}$, etc., which generate 1, 2, 3, 4 and 5 high intensity microwave regions, respectively. Additional high intensity microwave regions may be utilized advantageously in high volume manufacture of popcorn flakes. In accordance with certain embodiments of the invention, a heating chamber for popping popcorn kernels may encompass one or more high intensity microwave region within a single high intensity microwave region. In some embodiments, the heating chamber encompasses a single high intensity microwave region. In other embodiments, the heating chamber encompasses two high intensity microwave regions. In some embodiments, the entire waveguide comprises the heating chamber, and popcorn kernels may pass through a plurality of high intensity microwave regions as they cascade down the length of the waveguide. In yet other embodiments, the devices of the present invention may include multiple outlets corresponding to each of the one or more heating chambers. Thus, by using multiple heating chamber and multiple outlets, one may significantly increase the quantity of flakes produced.

It is also understood that the design of waveguides may require appropriate isolators to allow microwave power to pass through in the forward but not reverse direction, so as to protect the microwave generator (i.e., the magnetron) from the damaging effects of reverse power. Alternatively, microwave devices may also include circulators, which do not absorb power and therefore require a separate "dummy" waveguide load connected to the circulator to absorb the reverse power.

The systems and devices of the present invention may also include impedance tuners, which couple microwave power to a load by matching the respective complex impedances between the load and the microwave power source.

In some embodiments, the present invention contemplates achieving enhanced heating uniformity in a single-mode applicator by reciprocating a standing wave inside the applicator. For example, the system may split the generate microwave power into two equal and coherent wave fronts. The two forward power wave fronts are then diverted through rotating phase shifters and then reflected back through the phase shifters before being routed to opposite ends of the applicator. The two coherent wave fronts converge inside the applicator to generate a pattern of standing waves. The phase shifters operate by rotating a thin dielectric slab inside the waveguide with its rotational axis in the plane of the electric field. When the slab, having low dielectric loss and high dielectric constant characteristics, rotates between positions perpendicular to and parallel with the waveguide centerline the phase shift alternates sinusoidally from near zero to maximum. Adjusting the slab geometry varies the phase shift amplitude. Rotating both phase shifters synchronously and exactly 90 degrees out of phase with each other will then cause a sinusoidal reciprocation of the standing wave pattern inside the applicator at constant amplitude.

In one particular embodiment, for example, the microwave cavity may be a single-mode resonant cavity furnace, comprising a rectangular waveguide designed to support $TE_{103}$ rectangular waveguide mode, and is constructed from WR284 copper waveguide (7.21 cm×3.40 cm). The guide wavelength at 2.45 GHz in WR-284 is $\lambda g=23.12$ cm and the total length of the furnace cavity is approximately $l=1.5 \lambda g=34.8$ cm. A kernel loading inlet is located at approximately 17.50 cm from the source end (near the half-way point from each end), where the heating chamber is located at a field maximum (a high intensity microwave region) at resonance.

As will be appreciated, those skilled in the art may construct and use other single-mode resonant cavity furnaces having different dimensions that are suitable for popping popcorn kernels. Larger single-mode resonant cavity furnaces may be used, for example, to pop larger quantities of popcorn on a commercial or industrial scale.

In addition, the present invention further contemplates that high intensity focused microwaves may be generated at a predetermined and stable location with the use of microwave focusing devices, such as microwave reflectors and lenses. For example, microwave reflectors may be used, having a parabolic or hemispherical shape, for focusing microwaves at a specific location.

Heating Chamber

As illustrated in the accompanying drawings, the system and devices of the invention may include a heating chamber 18 for containing the popcorn kernels (not shown) while being heated. The heating chamber 18 is configured to contain the popcorn kernels within a defined area that encompasses one or more high intensity microwave region. In some embodiments, the microwave energy focusing device, such as waveguide 26, is configured such that at least a portion of one microwave energy maxima is located within the heating chamber 18. In some embodiments, the heating chamber 18 is constructed so as to permit or cause the kernels to move within or through one or more high intensity microwave region. In some embodiments, the heating chamber 18 encompasses a single high intensity microwave region or a portion of a single high intensity microwave region. In other embodiments, the heating chamber may encompass more than one high intensity microwave region, or a portion of more than one high intensity microwave region. In some embodiments, the heating chamber is constructed of a material that is generally transparent to microwaves, such as Teflon, glass, plastic or ceramic, so as to allow the microwaves to pass through the heating chamber walls and heat popcorn kernels disposed within the heating chamber. The dimensions of the heating chamber wall may also vary without significantly altering the microwave characteristics. By way of example, the heating chamber wall may, for example, be anywhere from 1-15 cm, or in come embodiments from 2-10 cm, or in other embodiments from 3-5 cm. A suitable thickness would, for example, be approximately 4 cm.

In some embodiments, the devices of the present invention may comprise a plurality of high intensity microwave regions within a single microwave applicator. In such cases, the devices may also contain a plurality of multiple heating chambers within the microwave applicator. It is further understood that a single heating chamber may encompass more than one high intensity microwave region. The heating chamber need not be concentric with a single high intensity microwave region. The heating chamber may, for example, pass through the high intensity microwave region on one side of the heating chamber while the other side of the heating chamber is not located in a high intensity microwave region. Similarly, the heating chamber may pass through all or part of a high intensity microwave region on one side of the heating chamber, while passing through all or part of a high intensity microwave region on the other side of the heating chamber. In such cases, the popcorn kernels may achieve a sufficiently high level of high intensity microwave heating as long as they are cycling through the heating chamber and through the separate high intensity microwave regions fast enough that the heating effect of the high intensity microwave region averages out.

In some embodiments, the heating chamber for heating popcorn kernels may include a lower portion 30 and an upper portion 32. The lower portion 30 may be disposed within the waveguide cavity 28 at the location of focused microwave energy within the waveguide. The heating chamber 18 may also include an outlet 34 connected to an upper portion 6 of the heating chamber 18 for discharging popped popcorn.

In some embodiments, the heating chamber 18 may be connected to at least one air source, such as an air blower 40, for circulating air within the lower portion 30 of the heating chamber 18 and/or for passing air from the lower portion 30 of the heating chamber 18 to the upper portion 32 of the heating chamber 18 and out of the heating chamber 18 through the outlet 34.

In some embodiments, the heating chamber 18 may be configured to allow popcorn kernels to move within and the through one or more high intensity microwave region within the heating chamber. For example, the kernels may be moved through the high intensity microwave region by airflow within the heating chamber 18 generated by the air source 40, such as a blower 40.

Figure 5:
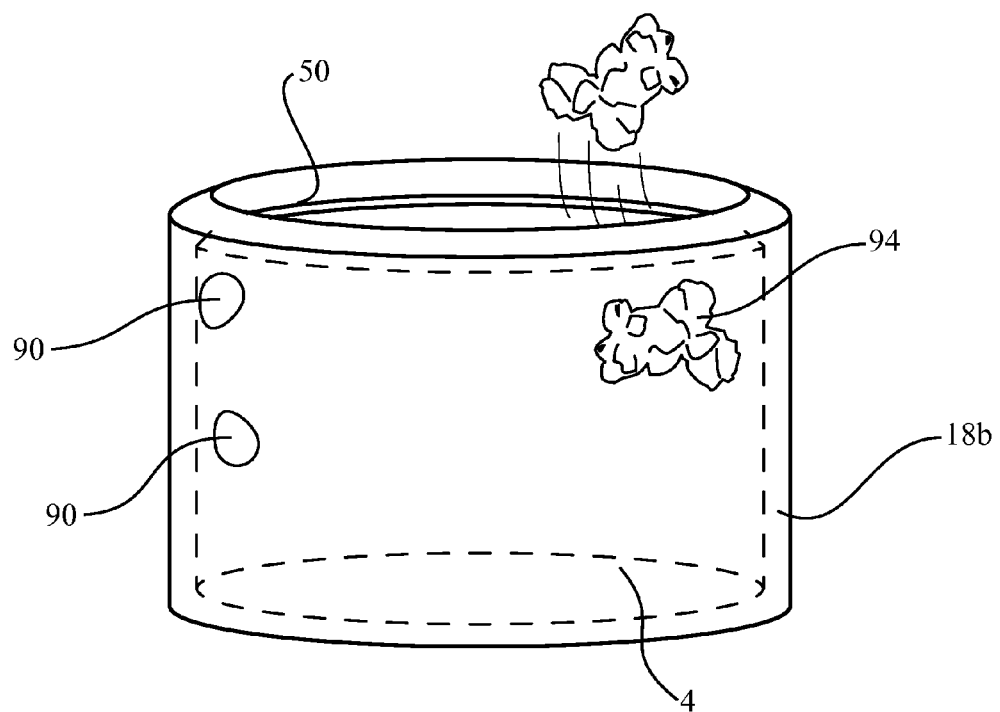
FIG. 5 shows a side view of a heating chamber in the form of a spinning cup for moving kernels within a high intensity microwave region.

In another embodiment, as shown in FIG. 5, the kernels may be moved through the high intensity microwave region by a rotating container within which the kernels are disposed. In some embodiments, the kernels may be moved through the high intensity microwave region by a combination of airflow and a moving container. In some embodiments, the rotating container 4 may also include an inwardly facing lip 50, sufficient to prevent un-popped popcorn kernels 90 from being removed from the container by airflow or by centrifugal force of the rotating container and simultaneously allow popped popcorn 94 to be removed from the container by airflow.

In some embodiments, as shown in FIG. 1, airflow is generated by an external air source 40, which then passes into the heating chamber through an air inlet 44, through the heating chamber 18, and finally out of the heating chamber through the outlet 34. The air inlet 44 may be configured with a grating, holes, or sieve with sufficiently small air inlet holes that un-popped kernels do not fall through the holes back into the blower, but large enough to enable sufficient airflow to move the kernels within the heating chamber.

The heating chamber 18 may be stationary, as shown in FIGS. 1 and 2, relying on airflow to move the corn kernels within or through the high intensity microwave regions. Alternatively, as shown in FIG. 5, the heating chamber 18 may rotate or move so as to cause the corn kernels to move within or through the high intensity microwave regions. As shown in FIGS. 1 and 1A, the air source 40 may cause the kernels to travel in a generally circular path in the heating chamber while the kernels are heated to cause more equal heating of the kernels. The same air source 40a or an alternate air source 40b may also be used lift popped flakes out of the heating chamber 18. It will be appreciated that a flake has a much greater volume for the given mass (which essentially remains the same before and after popping, less any dissipated moisture after popping) and thus has increased drag compared to an un-popped kernel. The airflow through the heating chamber 18 may be configured to have sufficient velocity to carry a popcorn flake out of the heating chamber, but lack sufficient velocity to carry an un-popped kernel of the heating chamber. This promotes popped popcorn flakes leaving the heating chamber 18 after popping, while allowing the un-popped kernels to remaining within the heating chamber until they achieve a sufficient level of heat and rupture.

Heating Chamber/Container

The heating chamber 18 functions to circulate un-popped popcorn kernels within and through one or more high intensity microwave region of high intensity microwave energy, so as to achieve rapid and uniform heating of the popcorn kernels. For example, the heating chamber 18 may comprise a container within which un-popped popcorn kernels are disposed. The container may be cylindrical in shape or conical or funnel (frustoconical) in shape. In some embodiments, the container may be adapted to include one or more air inlets 44a, 44b and an outlet 34. Airflow within and through the container may be utilized to move the popcorn kernels and achieve a more even distribution of heating of the kernels as the movement within and through the one or more high intensity microwave regions results in a sufficiently high average heating of the popcorn kernels.

In other embodiments, the container 18 may be configured to rotate so as to move the kernels within or through one or more high intensity microwave region, with or without airflow, thereby achieving an average high intensity heating sufficient to cause rapid and uniform heating of the popcorn kernels. In some embodiments, the container 18 may be configured to rotate so as to move the kernels horizontally within or through one or more high intensity microwave region, while also being configured to include an air inlet 44 and air outlet 34 for vertical airflow, so as to selectively remove popped kernels from the container with the upward vertical flow of air. The rotation of the heating chamber 18 may also be used advantageously to hold popcorn kernels against the side wall 38 of the heating chamber 18 by centrifugal force created by rotation of the heating chamber 18, thereby increasing the required force of airflow to remove the kernel before popping, and permitting increased force of airflow to achieve selective removal of popped flakes from the container. Moreover, the rotation of the container 18 further forces un-popped kernels to line up against the side wall, creating a trajectory of the kernels at a constant radius through the one or more high intensity microwave region that is well-defined, so as to achieve a more uniform average high intensity heating of the kernels.

The container may also be configured in the form of a cylinder or cone, with an inwardly facing lip 50 at the top sufficient to prevent un-popped kernels from exiting the container when the container is rotating. While rotation of the container forces popcorn kernels to the top by centrifugal force, the lip 50 (FIG. 5) prevents un-popped kernels from exiting the container. Popcorn flakes, having a size larger than the size of the lip, pass over the lip 40 by such means as airflow or centrifugal force and are removed from the container 18.

In another embodiment, the heating chamber 18 may be substantially cylindrical in shape, with vertical side walls 38, with an inwardly facing lip 50 at the top of the container. In embodiments utilizing vertical airflow to remove popped kernels, the inwardly facing lip 50 is sized so as to prevent un-popped kernels from exiting the container, while popped kernels, being sized larger than the extension of the inwardly facing lip, are blown over the lip by vertical airflow and removed from the container.

Air Source

The heating chamber 18 may be connected to one or more air source 40, such as a fan or air blower, for creating airflow within the heating chamber and causing the popcorn kernels to move within the heating chamber 18. In some embodiments, the device comprises one or more airflow inlets 44 and an airflow outlet 34. The blower causes airflow to pass through the heating chamber 18. In some embodiments, the blower is configured to cause airflow within or through the heating chamber 18 from a lower portion 30 of the heating chamber to an upper portion 32 of the heating chamber and through the airflow outlet 34 of the heating chamber 18. The airflow outlet 34 of the heating chamber 18 is connected to an outlet tube 60 that discharges the air and the popped popcorn flakes into a receptacle 64.

Figure 1E:
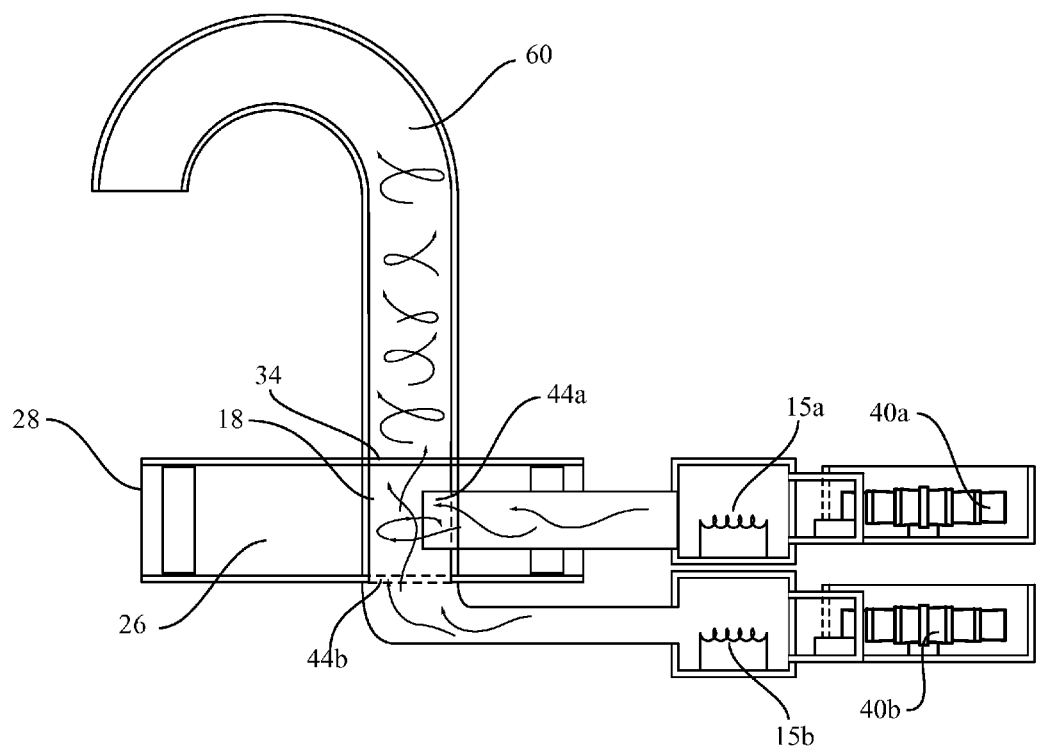
FIG. 1E shows a view of an air blower and heating chamber having two separate blowers, each having a separate input into the heating chamber.

The blower may be configured to cause airflow within the heating chamber in a horizontal direction so as to cause the un-popped kernels of popcorn to circulate within and through the microwave high intensity microwave region. As shown in FIGS. 1 and 1A, the heating chamber 18 may further comprise an air input 44*a* in the side wall 7 of the heating chamber, wherein the horizontal of airflow comprises airflow input tangentially into the heating chamber 18 from the side wall 38 of the heating chamber 18 at an angle generally perpendicular to the radius of the cylindrical heating chamber (see FIG. 1A). The blower or other air source 40 may also be configured to cause airflow within the heating chamber 18 in an approximately circular path and move the popcorn kernels generally horizontally within the heating chamber in an approximately circular path within and through the high intensity microwave region. In some embodiments, the heating chamber 18 is cylindrical and substantially circular in cross-sectional shape and the blower is configured to cause airflow within the heating chamber in an approximately circular path and move the popcorn kernels horizontally within the heating chamber in an approximately circular path. In some embodiments, an air source 40 may also be provided to cause airflow within and through the heating chamber 18 in a vertical direction, so as to selectively lift popped popcorn flakes upwardly and out of the heating chamber 18. For example, the device may be configured with two air blowers, air blower 40*a* and a second air blower 40*b*, as shown in FIG. 1E. The blower 40*b* may be configured to cause vertical airflow from a lower portion 30 of the heating chamber 18 upwardly to an upper portion 32 of the heating chamber 18 and thereby selectively move the popped popcorn out of the heating chamber when popped. Because un-popped kernels are smaller and have a smooth surface they have less air drag than popped flakes, which are larger and have an irregular surface having greater air drag. The vertical airflow is selected so as to lift popped flakes against the force of gravity out of the heating chamber 18, while not lifting un-popped kernels out of the heating chamber.

In some embodiments, one or more air source 40 may be configured to create airflow in both a vertical and horizontal direction. For example, the blower may be configured to create airflow in an upwardly spiral direction. Alternatively, the airflow may be configured to form a vortex with the heating chamber 18 and/or outlet tube 60. Two separate air sources 40 may be utilized to provide vertical and horizontal airflow. The airflow may be generated, for example, by a first blower 40*a* and a second blower 40*b*, wherein the first blower is configured to create airflow in a horizontal direction and the second blower is configured to create airflow in a vertical direction. Alternatively, single blower may be configured to provide airflow in both a vertical and horizontal direction by providing two separate air ducts from the blower to each of the air inlets 44*a* and 44*b*. Where separate first and second blowers are utilized, each blower may be configured to independently provide a different rate of airflow for the vertical and horizontal airflows. For example, one or more of the blowers may be configured to independently provide sudden or increased airflow for the purpose of removing unpopped kernels of popcorn from the heating chamber 18. Similarly, the vertical and horizontal airflows may independently provide hot air or cold air.

In some embodiments, the airflow is maintained at a velocity that maintains kernels in a generally circular flow pattern prior to popping, where the velocity is sufficient to selectively lift a popped kernel of corn out of the heating chamber 18 as a result of the increased drag created by the larger volume and irregular shape of the popcorn flake. In particular embodiments, the airflow has a flow-rate that will move a volume of kernels through a high intensity microwave region sufficient to rapidly and uniformly heat the load of unpopped kernels, while maintaining the unpopped kernels within the high intensity microwave region without being expelled.

In addition, in another embodiment, heated airflow may be used to remove residual moisture from and brown popcorn flakes.

Preheating

In accordance with another aspect, the present invention provides a heat source for preheating the one or more kernels prior to being disposed within the heating chamber. In some embodiments, the devices of the invention may include a heater for heating the airflow to be passed through the heating chamber. The un-popped popcorn kernels may be preheated by the heated airflow so as to increase the efficiency of the final microwave popping. Accordingly, in some embodiments, the systems and devices may further comprise a heating element to cause heating of the airflow. In some embodiments, as shown in FIG. 1E, the air source or blower 40a or 40b may include heating elements 15a and 15b which heat the airflow. The air being blown into the airflow chamber may, for example, between ambient room temperature of about 20° C. to about 232° C., or alternatively from about 50° C. to about 150° C., or alternatively from about 70° C. to about 180° C., or alternatively from about 80° C. to about 95° C. Generally, popcorn pops when the popcorn kernel reaches an internal temperature of approximately 135 psi (930 kPa) and a temperature of about 180° C. (356° F.). Thus, the popcorn kernels may be preheated, without resulting in popping, when heated to a temperature less than 180° C. (356° F.). In other embodiments, the heating chamber 18 within which the popcorn kernels are dispose may itself be heated. In yet other embodiments, the popcorn kernels may be preheated within the storage container used to dispense the popcorn kernels into the heating chamber 18.

In other embodiments, the systems and devices of the invention may also comprise a heat source for preheating the one or more kernels prior to being disposed within the heating chamber. For example, the kernels may be preheated with a heat source selected from one or more of a flame, infrared heat, convection heat or heat from a resistive element.

In some embodiments, the devices of the invention further comprise a control module for controlling the temperature, flow rate, and flow path of the air.

Inlets/Outlets

As shown in FIGS. 1 and 1A, in some embodiments a popcorn kernel storage container 66 is provided, which dispenses popcorn kernels through the dispensing tube 68 and into the heating chamber 18. An inlet 69 is configured to dispense a quantity of popcorn kernels into the heating chamber 18. The inlet may be located either on the side wall 38, the bottom or the top of the heating chamber. FIGS. 1A and 1B show an inlet 69 into the sidewall 38 of the heating chamber 18, allowing popcorn kernels to be dispensed into the heating chamber by force of gravity. Popcorn kernels may be dispensed into the heating chamber from a storage chamber 66 that is connected to the heating chamber 18 by means of a dispensing tube 68. The storage chamber 66 may be located above the heating chamber 18, where it can dispense popcorn kernels to the heating chamber by gravity, or may alternative be located to the side of or below the heating chamber, where popcorn kernels would need to be dispense to the heating chamber by means of a conveyor, lift, plunger or airflow. In some embodiments, the inlet 69 is configured to dispense through popcorn kernels into the heating chamber 18 in such a manner that popcorn kernels circulating within the heating chamber 18 do not reenter the dispensing tube 68. For example, the inlet 69 may connect to the heating chamber at an angle, such that popcorn kernels circulating in one direction bypass the inlet 69 at an acute angle relative to the angle popcorn kernels enter the heating chamber 18 through the inlet 69 and do not reenter the dispensing tube.

In some embodiments, the storage chamber 66 may also include a metering device 67 for controlling the number of popcorn kernels being released into the heating chamber 18 in batch mode. Alternatively, the metering device 67 may control the rate of flow of popcorn kernels being released into the heating chamber 18 for dispensing kernels in a continuous mode. For example, the metering device 67 may regulate the rate of flow to enable continuous feeding kernels into the heating chamber 18. Such a metering device includes, for example, a microphone for detecting the sound of a kernel popping, coupled to a controller that regulates one or more process parameter, including air velocity, speed of circulating kernels, input of new kernels, microwave intensity, etc.

The devices of the invention further include an outlet 34 from the heating chamber. In some embodiments, the devices comprise an outlet tube 602 connected to the outlet 34 of the heating chamber 18. In some embodiments, the inner surface of the outlet 34 may comprise surface irregularities that assist in moving popped flakes to exit the outlet 34. For example, in some embodiments, the inner surface may comprise irregular bumps or indentations. In other embodiments, the outlet tube 72 may include a ribbed inner surface 73. By way of example, the ribbing 73 on the inner surface 602a of the outlet tube 602 may comprise a helical coil or a plurality of individual rings fixed to the inner surface. Alternatively, the ribbing may comprise grooves machined into the inner surface.

The microwave devices of the present invention may also include any one of numerous sensory inputs that regulate the flow of popcorn kernels into the heating chamber, the rate of airflow, the degree of preheating, etc. For example, the present invention contemplates the use of a microphone pop detector for sensing the sound created by the popping kernel and/or the frequency of the noise of popping, coupled with the kernel flow metering unit that dispenses additional quantities of popcorn when the popping ceases or the frequency of popping falls below a selected threshold. In addition, such inputs may include sudden increased airflow to clean passageways of un-popped kernels or popped flakes that may occasionally adhere to surfaces.

The use of high field intensity high intensity microwave regions for popping popcorn kernels further enables novel kernel feed approaches. For example, in some embodiments, kernels may be sprayed onto a strip of paper having an edible adhesive surface and the strip of paper with adhere kernels may then be fed through the high intensity microwave region where the kernels pop and release from the paper, or alternatively pop and remain adhered to the paper.

Vending Machines

Figure 7:
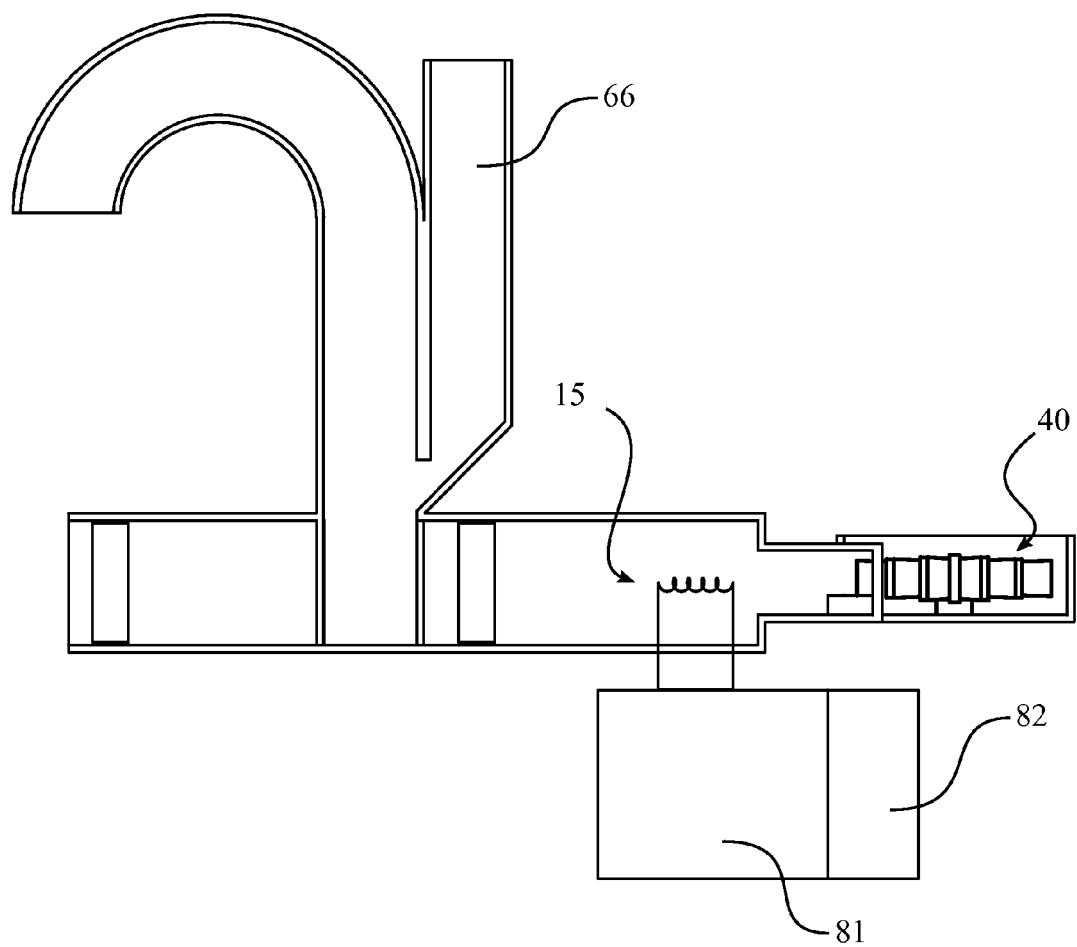
FIG. 7 shows a single-mode microwave device having a customer interface.

The systems, devices and methods of the present invention may also be utilized to provide popcorn vending machines, for rapid, automated and convenient dispensing of popcorn at entertainment venues. For example, such automated vending machines may be configured to dispense a specified quantity of popcorn to a purchaser upon activation of a purchase transaction via a customer interface 82 (as shown in FIG. 7) which is used to initiate the transaction by a purchaser. The purchase transaction may comprise payment by coin, paper bill, a debit card or credit card, pre-paid credit/debit card or gift card, internet banking service, token, near-field transmission card (radio frequency identification, or RFID), QR code, or the like. Thus, the device may include any suitable customer interface capable of interacting with such payment methods. Such customer interface may include, for example, a magnetic card reader, a near-field reader, a QR reader, or a keypad to manually enter credit card information. The purchase transaction may comprise electronic payment activated by a mobile device. Any suitable method for initiating such a purchase transactions is contemplated herein. The machines may, for example, be connected to the internet, either by wireless or telephone cable signal, with encrypted transactions being activated by the purchaser on demand, and dispensing of product upon receipt of payment.

The vending machines contemplated by the present invention will be highly efficient in dispensing popcorn to purchasers as a result of the rapid popping and the unique physical properties of the resulting popcorn. The relatively small size of the devices disclosed herein are particularly suitable for vending machines, which may be moved from one venue to another, thus avoiding the need for dedicated machines that remain at a venue permanently, even when no activities at the venue are taking place.

The significantly increased popping rates achieved through the devices and methods of the present invention further expand the utility of popcorn popping machines in commercial, military and humanitarian applications. For example, the high intensity microwave region popping machines can produce significantly larger quantities of popcorn on demand, within less than 20-30 seconds, such that it can keep up with customer demand at large entertainment venues, thereby increasing total sales. Moreover, the relatively small size of the high intensity microwave region popcorn popping machines makes the machines significantly more portable, such that a single machine can be moved from one venue to another venue, thereby achieving a higher utilization of a given machine.

The microwave popping machines disclosed herein may be operated from any suitable power source, include a standard electrical outlet. Portable machines may be powered either by standard electrical outlets available at the venue source, or may be operated by generator, battery, solar power, automotive power, or other available power supply. Battery or solar powered devices may be useful, for example, when the device is used in remote locations where standard electrical power source is unavailable. It is understood by those skilled in the art that battery or solar powered devices may require modifications to the electronics system that regulates operation of the device.

The vending machines disclosed herein may also comprise a high capacity storage chamber 66, as shown in FIG. 7, suitable for storing sufficient quantities of kernels to be dispensed during high demand or for large groups of individuals. Vending machines may also include, for example, metering devices 67 for controlling the quantity of kernels dispensed into the heating chamber.

Methods

The improved system and method of making popcorn heats popcorn kernels with microwave electromagnetic radiation by creating high intensity microwave regions within a heating chamber. The popcorn kernels are heated in the high intensity microwave regions until they pop into flakes. During the process, airflow passes through the heating chamber from a lower portion of the chamber to an upper portion of the chamber. The airflow blows the popped popcorn out of the heating chamber as a result of the increased drag coefficient of the larger irregularly shaped popped popcorn, while allowing the smaller more uniformly shaped un-popped kernels to remain in the chamber until they eventually pop.

In one aspect, the present invention also contemplates novel methods for making popcorn. In one embodiment, a method is provided that comprises the steps of passing electromagnetic microwave radiation through a heating chamber and maintaining at least one antinode of at least one microwave at a substantially fixed location within the heating chamber. The popcorn kernels are heated with the microwave radiation at approximately the location of the one or more antinode.

In another aspect, the present invention provides a method of popping popcorn kernels, comprising moving popcorn kernels within a heating chamber with airflow; and subjecting the popcorn kernels to microwave energy sufficient to cause the popcorn kernels to pop, resulting in popped popcorn. In one embodiment, the microwave energy is focused microwave energy.

In yet another aspect, the present invention provides a method for popping popcorn kernels, comprising generating in a single-mode resonant microwave applicator a standing microwave energy field comprising an array of one or more anti-node high intensity microwave regions, and subjecting popcorn kernels to the microwave energy in the one or more high intensity microwave regions, sufficient for the popcorn kernels to achieve a uniform distribution of microwave energy heat to cause the popcorn kernels to pop.

In yet another aspect, the present invention provides a method for making popcorn, comprising generating in a single-mode resonant microwave applicator a standing microwave energy field comprising an array of one or more high intensity microwave regions; providing a heating chamber encompassing the one or more high intensity microwave regions; delivering popcorn kernels to the heating chamber, wherein the popcorn kernels are moved through the microwave high intensity microwave region within the heating chamber to achieve a highly uniform distribution of microwave energy heat until popped; and selectively discharging popped popcorn from the heating chamber by upward airflow.

Density

The methods and devices of the present invention were surprisingly effective in rapid and highly complete popping of popcorn kernels. Indeed, it was discovered that the above methods and devices produced popcorn produced popcorn having unique and unexpected physical properties. While it has previously been believed that popping popcorn too quickly is disadvantageous because the starch does not have time to gelatinize, the popcorn popped in accordance with the principles of the present invention achieved surprising results which appear to show increased expansion of the starch, resulting in a larger popcorn flake, as well as more complete popping of the popcorn kernel (with less residual unpopped popcorn shell), without undesirable burning of popcorn flakes.

Yet another surprising result was the discovery that popcorn produced using the methods and devices of the present invention resulted in popcorn that was more completely popped, such that the resulting popcorn contained less residual un-popped kernel shell. Thus, the methods and devices of the present invention improved popping efficiency (i.e., the completeness of popping of individual kernels), as measured by removing residual un-popped kernel shells from the popped popcorn and determining the weight percent of the residual shells relative to the entire popped kernel (popped portion, plus residual un-popped portion).

Among the many advantages of the popcorn flakes of the present invention is that lower density popcorn flakes fill a larger volume of space, thereby reducing the amount (and cost) of popcorn kernels needed to fill a specified volume purchased by a consumer and also reducing the number of calories consumed by that consumer. Furthermore, the larger size of popped flakes further increases the surface area onto which coatings may be applied, such as flavorings, colorings, etc.

Turning now specifically to the drawings, FIG. 1 shows a popcorn popping system 10. In order to pop popcorn, kernels are dispensed into a heating chamber 18. This may be done from a storage container 66 through a dispensing tube 68 and through an inlet 69. The popcorn kernels are subjected to microwave energy emitted from an antenna 24 connected to a magnetron 22. The microwave energy is contained in a waveguide 28 to establish a substantially standing wave so that the microwave energy has nodes of minimal energy and anti-nodes of maximal energy. The heating chamber 18 is disposed about the anti-node so that the popcorn kernels disposed therein are exposed to high levels of focused microwave energy.

The focused microwave energy could quickly heat one side of the popcorn and cause it to rupture. As noted above, very rapid heating has previously been taught to be disadvantageous, as the starch in the popcorn kernels does not have time to gelatinize. In accordance with one aspect of the present invention, however, it has been found that rapid heating of the kernel can actually provide improvements. By circulating the popcorn kernels in the heating chamber 18, the kernels revolve through the area within and around an anti-node, and may be heated more uniformly within the individual kernels and as a group. This, in turn, allows the popcorn kernels to rupture in multiple locations at substantially the same time rather than rupturing at a single hot spot. Rather than having reduced gelatinization of the starch, the present process appears to provide increased gelatinization and a popcorn flakes which are not only larger in volume than a conventional popcorn flake, but also at least as long, and frequently significantly longer, than a conventional popcorn flake.

The movement of the popcorn kernels in the heating chamber 18 can be accomplished by a variety of methods. These may include forced air circulation, rotating the heating chamber itself or other mechanism which may be apparent in light of the present disclosure. As shown in FIGS. 1 and 1A, the movement of the popcorn kernels may be accomplished by an air source 40 such as a single air blower or a plurality of air blowers which inject air into the heating chamber generally parallel to the bottom of the heating chamber 18. The airflow will initially follow a generally circular path around the lower portion 30 of the heating chamber 18 (as shown in FIG. 1A) and will then gradually move up through the heating chamber 18 in a helical path and out through the outlet tube 60. Such a pattern not only moves the un-popped kernel in a generally circular pattern, but it also lifts popped kernels out of the heating chamber and into the outlet tube 60 and eventually into a receptacle 64.

While a single air source 40 may be used, two or more air sources may be used. For example, as shown in FIG. 1, one air source forces air through an inlet 44 which is tangential to the cylindrical cross-section of the bottom of the heating chamber 18, while the other forces air through an inlet 44b in the bottom of the heating chamber. Such a configuration allows for one air path to principally drive the corn kernels in a circular pattern within the heating chamber while the other air path is generally vertical and lifts popped flakes out of the heating chamber through the outlet 34. It will be appreciated that a single blower could be used to create both airflows, via a split air tunnel or tubing.

Heating elements 15 may be disposed along either air source 40 to preheat the air. It has been found that preheating the air can improve kernel rupture and reduces the amount of hull which is left over. The heating elements 15 are advantageous as they provide additional control over the heating gradient occurring with the popcorn kernels. The microwave energy heats the water contained in the kernels to gelatinize the starch, while the heated air can be used to facilitate rupture within a desired window of time.

The airflow can also be used to regulate humidity. For example, a humidifier 42 may be placed in communication with the blower 40. The humidifier can be used to add moisture to the air to get popcorn flakes having a desired consistency for adhering popcorn flakes together to form shapes, and also to improve the ability of popcorn flakes to receive and retain flavorings such as salt and butter.

One interesting aspect of utilizing the method of the present invention is that popcorn flakes made according to the present invention typically have less hull remnants attached to each popcorn flake. Moreover, the hull remnants that do remain are generally lighter and softer than hull remnants which are part of conventional popcorn flakes.

Turning now to FIG. 2, there is shown an overlay of a heating chamber 18 and a wave representing focused microwave energy 80 as may be achieved from a wave guide. The microwave energy 80 has nodes 82 of minimal energy and anti-nodes 84 of maximal energy. At a frequency of 2.45 GHz, the wavelength is approximately 12.2 cm. Thus, the nodes 82 are spaced apart approximately 6.1 cm. Likewise, the anti-nodes 48 are spaced apart a similar distance. In order to contain the un-popped kernels 90 in the area of the anti-node 84 and subject them to maximal energy, the popcorn kernels are preferably contained in the half of the area most closely surrounding the anti-node. Thus, the heating chamber 18 may be less than one-half of the wavelength of the microwave energy, or alternatively about one-quarter of the wavelength, such as between about 2.5 and 3.1 cm (1 and 1.25 inches) for 2.45 GHz.

As the kernels revolve and pass through the anti-node 84, the kernels more evenly heat. When the hull ruptures, the kernels expand outwardly. One surprising result of the present invention is that the flakes are longer and may be larger than conventional flakes. It is believed that the increased size may be due to a more complete gelatinization of the starch caused by the starch being more evenly heated.

Turning now to FIG. 3, there is shown an overlay between an alternate configuration of the heating chamber 18a and the microwave energy 80. Rather than using a heating chamber which is about one-quarter of wavelength in diameter, the heating chamber is about one-half the wavelength (i.e. between about 5.9 cm and 6.5 cm (2.25-2.5 inches) in diameter). This places the popcorn kernels 90 in a position where they repeatedly pass through the anti-nodes 84 of the microwave energy 80. While such a configuration is advantageous over the art, it is believed that the configuration shown in FIG. 2 is more advantageous.

While the use of airflow is advantageous to move the popcorn kernels in the heating chamber 18, it is not necessary. For example, FIG. 4 shows a heating chamber 18b in the form of a spinning cup. The spinning cup 18b supplies centrifugal force to the kernels, thereby keeping the kernels moving around and through the anti-node 84 or plane of maximal energy of the microwave energy.

To prevent the un-popped kernels 90 from escaping from the spinning cup 18b, an annular lip 50 or a series of projections may be disposed adjacent the top of the spinning cup. The lip 50 is preferably sized to contain un-popped kernels, while allowing popcorn flakes to easily pass out of the heating chamber 18b. Thus, for example, the lip 50 may extend between about 1-10 mm. Unpopped kernels will run into and be held in the heating chamber 18b by the lip, but the larger popcorn flakes 94 will easily pass the lip and leave through the outlet of the heating chamber.

While discussed as being moved by airflow and a spinning cup, it will be appreciated that other means exist for spinning the popcorn within the heating chamber so as to circulate the kernels about the anti-node 84. Such other means are intended to be covered by the appended claims.

FIG. 5 shows an overlay of a microwave energy pattern 80 and a plurality of heating chambers 18 of the present invention. While a portion of one wavelength of the microwave energy may be used, the waveguide or other structure may be used so that multiple wavelengths are used to thereby allow multiple heating chambers to be used. Such a configuration may be beneficial, for example, in commercial applications where large volumes of popcorn are desired.

FIG. 1A shows a view of a heating chamber outlet tube 60 comprising an interior 72a having ribbing 73. In accordance with one aspect of the present invention, it has been found that the use of ribbing 73 along the inner surface 72a of the outlet tube 60, or a helical wire in the outlet tube, enhances popcorn flow through the outlet tube.

While rapid heating has previously been thought to inhibit gelatinization and expansion of the starch, it has been found in accordance with the principles of the present invention that the average popcorn kernel is at least as large as that cooked in accordance with prior art methods. Moreover, testing (as described in the Examples, below) has demonstrated that the popcorn formed in accordance with the present invention is longer than conventional popcorn flakes, thereby providing increased volume per kernel. This enables a given volume of popcorn to be sold having fewer calories.

While FIG. 1 shows one embodiment of a microwave wave guide which can be used in accordance with the principles of the present invention, it will be appreciated that other types of wave guides may be used. For example, FIG. 6 shows an alternative microwave waveguide applicator 100 for popping popcorn kernels. The applicator 100 includes a magnetron 102, an antenna 104, a wave guide 106 which is generally circular and a heating chamber 108 in which the popcorn kernels may be disposed.

As shown in FIG. 7, the devices of the present invention may also be configured with a portable power supply 81, such as a battery, solar power generator, or hookup for an automobile battery. The portable device may include, for example, a customer interface 81 operably connected to the electronics system 81 that communicates with a payment source where funds are located for payment of the product resulting from the device.

The popped flakes produced using the devices and methods disclosed herein may be used in numerous applications, including food products, packaging materials (i.e., for thermal insulation, cushioning of fragile materials, etc.), confetti for celebratory or entertainment events, and the like.

Thus, there are disclosed new apparatuses and methods for popping popcorn. It will be appreciated that numerous modifications may be made without departing from the scope and spirit of the invention. For example, the present invention may be modified further by adding multiple output ports to increase the volume of popcorn flakes produced, or may be modified with air blowers at or near the exit tubes so as to increase the velocity of popcorn flakes exiting the device, or may be modified by adding other obvious features, such as handles, wheels, packing cases, etc. The appended claims cover such modifications to the devices and methods claimed below.

EXAMPLES

Comparison of Popped Flakes Using Focused Microwaves

The following tests were conducted to compare popcorn flakes made using the focused microwave system of the present invention with popcorn flakes made using standard hot air popper method and a standard kitchen microwave device.

Devices Used. The standard kitchen microwave device used in these experiments (to pop the microwave bag popcorn) was an Amana Radarrange brand microwave system, Model MVH250 W, configured for an output of 1.0 kW (with an input of 1.5 kW) at a frequency of 2.54 GHz. The microwave popcorn used was Pop-Secret Premium Popcorn Sea Salt (3.5 oz bag).

The hot air popper used in these experiments was a West Bend Hot Air Popper, operated at 1.2 kW of power.

The focused microwave applicator system used in these experiments was a pilot-scale microwave food processing unit that utilized a rectangular single-mode microwave resonant cavity having a cross section of 8.6 cm×4.3 cm (3.4"× 1.7") and a length of 12.7 cm (5"). The focused microwave applicator was operated at 1.1 kW of power and applied microwaves at a frequency of 2.54 GHz. The focused microwave applicator was also configured with a hot air blower for circulating popcorn kernels and preheating the popcorn kernels with hot air at a temperature of 81° C.

Methods. Volume capacity means the volume of 60 popped popcorn flakes. Volume capacity is determined by randomly selecting 60 popcorn flakes popped by a particular popping method or system, placing the 60 popcorn flakes in a graduated cylinder, followed by 6 gentle shakes (of approximately ½ inch length motions on a soft surface, by tapping the top of the cylinder with a hand), and repeating until the volume measurement does not change by any statistically significant margin. Average volume capacity is determined by taking the above measurements of at least 8 batches of 60 popcorn flakes.

A 1000 mL 2.5 in diameter glass graduated cylinder was used to measure the volume of 60 popped flakes to determine the density of the flakes. After the popcorn was popped, popped flakes were put in a cylinder and the volume of the popped flakes was measured as follows. The cylinder was shaken 6 times (approximate ½ inch length motions accomplished by setting the cylinder on a compliant surface such as a chair cushion and then hitting the top of the cylinder with ones hand), a measurement was retaken, and the shaking procedure was repeated until the volume did not change. The final stable volume measurement was the measurement used. All measurements were taken on the day that the flakes were popped, to avoid possible changes to volume occurring over time (due to breakage of flakes or due to the flakes drying out).

The tests were conducted by popping popcorn kernels obtained from the same source of kernels, but using the following three different methods of popping: (1) focused microwaves in accordance with a device of the present invention (8 Batches, 480 kernels, 469 popped), (2) a hot air popping machine (9 Batches, 540 kernels, 483 popped), and (3) a commercially available microwave bag in a standard kitchen microwave (4 Batches, 1369 kernels, 1275 popped).

Results. The results showed that focused microwave popped flakes not only had significantly improved volume, but also that the focused microwave device was significantly more efficient, resulting in a significant increase in the percentage of popcorn kernels popped in each batch (popping yield). The hot air popped popcorn proved to have the lowest volume. Therefore it was used as the base volume and the percentage increase was calculated using the following formula: (Vol A−Vol Air Popped)/Vol Air Popped. Thus the percent increase volume of Hot Air Popped versus Hot Air Popped equals zero. The percentage of kernels popped was determined by placing 60 Kernels in the focused microwave popper as well as the hot air popper. In the microwave bag test the microwave bag was popped first then the kernels counted afterwards. Then the percentage popped is calculated. Time to first pop was determined by placing kernels in their popping machine and starting the timer the moment the machine is turned on. When the first pop was heard the time was recorded. Finally, the time to last pop was determined by placing the kernels in their popping machine and starting the timer the moment the machine is turned on. As the popping rate slowed down, the user noted the time of each of the last pops. Once the popping has ended, the machine was turned off and the last of the last pop times was used to mark the last pop. The results obtained are shown below in Table A.

TABLE A

Comparison of Focus Microwave Popcorn Flakes with Hot Air and Microwave Bag Flakes

| Method | Average Volume | % Increase in Volume | % Popped | Average time to first pop | Average time to last pop |
|---|---|---|---|---|---|
| Focused Microwave | 542 mL | 30% | 98 | 10 | 17 |
| Microwave Bag | 480 mL | 15% | 93 | 69 | 189 |
| Hot Air Popped | 418 mL | 0% | 89 | 48 | 78 |

Table A shows that the device and methods of the invention significantly improve the average volume of popcorn flakes compared to using a hot air popper or a microwave bag. While hot air popping and microwave bag popping resulted in an average volume of popped flakes of 418 mL and 480 mL, respectively, the use of focused microwave device of the present invention resulted in an average volume of 542 mL, which represents a 13% improvement over the microwave bag method and a 30% improvement over the hot air method. Specifically, the device and methods of the present invention were successful in improving the average volume of popped flakes to greater than 480 mL.

Table A further shows that the device and methods of the invention significantly improve the efficiency of popping kernels compared to using a hot air popper or a microwave bag. While hot air popping and microwave bag popping resulted in an average popping efficiency of 89% and 93%, respectively, the use of focused microwave device of the present invention resulted in an average popping efficiency of 98%

Table A also shows that the device and methods of the invention significantly improve the speed of popping, including the speed at which the first kernel is popped and the speed at which the last kernel is popped. While hot air popping and microwave bag popping resulted in an average first pop time of 48 seconds and 69 seconds, respectively, the use of focused microwave device of the present invention resulted in an average first pop time of 10 seconds. Moreover, while hot air popping and microwave bag popping resulted in an average last pop time of 78 seconds and 189 seconds, respectively, the use of focused microwave device of the present invention resulted in an average last pop time of 17 seconds.

The invention claimed is:

1. An apparatus for popping kernels, comprising:
a heating chamber for containing kernels;
a microwave emitter configured to produce microwave energy within the heating chamber and heat the kernels;
a microwave energy focusing device configured to generate a stable focused high intensity microwave region within the heating chamber; and
an air blower configured to create airflow within the heating chamber in a horizontal direction sufficient to move kernels in a generally horizontal and generally circular path in the heating chamber.

2. The apparatus of claim 1, wherein the air blower is configured to move kernels in the heating chamber at a sufficient speed to substantially uniformly heat the kernels.

3. The apparatus of claim 2, wherein the air blower is configured to circulate kernels within the heating chamber at a velocity greater than 1 revolution per second.

4. The apparatus of claim 1, wherein the apparatus comprises an airflow input and an airflow outlet and the air blower causes airflow to pass in the airflow input, through the heating chamber, and out of the airflow outlet.

5. The apparatus of claim 1, further comprising an air input in the side of the heating chamber, wherein the horizontal airflow comprises airflow input into the heating chamber from the side of the heating chamber at an angle generally tangential to the heating chamber.

6. The apparatus of claim 1, wherein the heating chamber is generally cylindrical in shape and the air blower is configured to cause airflow within the heating chamber in an approximately circular path and move the kernels horizontally within the heating chamber in an approximately circular path.

7. The apparatus of claim 1, wherein the air blower is configured to cause airflow within the heating chamber in a vertical direction.

8. The apparatus of claim 7, wherein the air blower is configured to cause vertical airflow from a lower portion of the heating chamber upwardly to an upper portion of the heating chamber.

9. The apparatus of claim 7, wherein the air blower is configured to cause the vertical airflow at a rate sufficient to selectively move popped flakes out of the heating chamber when popped as a result of the increased drag of the popped flakes.

10. The apparatus of claim 1, wherein the air blower is configured to create airflow in both a vertical direction and a horizontal direction.

11. The apparatus of claim 10, wherein air blower is configured to create airflow in an upwardly spiral direction.

12. The apparatus of claim 10, wherein the air blower comprises a first air blower and a second air blower, wherein the first air blower is configured to create airflow in a horizontal direction and the second air blower is configured to create airflow in a vertical direction.

13. The apparatus of claim 1, further comprising a heating element disposed in communication with the air blower to cause heating of the airflow.

14. The device of claim 13, wherein the heating element is configured to heat the airflow to a temperature between about 50° C. to about 150° C.

15. The device of claim 13, wherein the heating element is configured to heat the airflow to a temperature between about 80° C. to about 95° C.

16. The apparatus of claim 1, further comprising a heat source for preheating the kernels prior to being disposed within the heating chamber.

17. The device of claim 13, wherein the kernel is preheated to an internal temperature less than 180° C.

18. The apparatus of claim 16, wherein the heat source is selected from one or more of a flame, infrared heat and convection heat.

19. The apparatus of claim 1, wherein the high intensity microwave region includes a microwave energy maxima located within the heating chamber.

20. The apparatus of claim 19, wherein a single high intensity microwave region is located within the heating chamber.

21. The apparatus of claim 19, wherein a plurality of high intensity microwave regions are located within the heating chamber.

22. The apparatus of claim 1, wherein the high intensity microwave region excludes a microwave energy maxima located within the heating chamber.

23. The apparatus of claim 22, wherein a plurality of high intensity microwave regions are located within the heating chamber.

24. An apparatus for popping kernels, comprising:
a heating chamber for containing kernels;
a microwave emitter configured to produce microwave energy within the heating chamber and heat the kernels;
a waveguide for channeling microwave enerqy from the microwave emitter into the heating chamber, the heating chamber disposed within the waveguide; and
at least one air blower disposed in communication with the heating chamber for moving kernels within the heating chamber.

25. The apparatus of claim 24, wherein the heating chamber is smaller than the microwave wavelength.

26. The apparatus of claim 24, wherein the heating chamber diameter is between about 2.54 cm and 3.1 cm.

27. The apparatus of claim 24, wherein the at least one air blower comprises a first air blower configured to blow air into the heating chamber substantially horizontally and a second air blower configured to blow air into the heating chamber substantially vertically.

28. An apparatus for popping kernels, comprising:
a heating chamber for containing kernels;
a microwave emitter configured to produce microwave energy within the heating chamber and heat the kernels;
a microwave energy focusing device configured to generate a plurality of stable focused high intensity microwave regions, each having a microwave energy maxima within the heating chamber; and
at least one air blower configured to create airflow within the heating chamber sufficient to move the kernels within the heating chamber.

29. The apparatus of claim 28, wherein the at least one air blower is configured to move kernels in the heating chamber at a sufficient speed to substantially uniformly heat the kernels.

30. The apparatus of claim 29, wherein the at least one air blower is configured to circulate kernels within the heating chamber at a velocity greater than 1 revolution per second.

31. The apparatus of claim 28, wherein the at least one air blower is configured to create airflow within the heating chamber in a horizontal direction sufficient to move kernels in a generally horizontal and generally circular path in the heating chamber.

32. The apparatus of claim 28, wherein the heating chamber is generally cylindrical in shape and the at least one air blower is configured to cause airflow within the heating chamber in an approximately circular path and move the kernels horizontally within the heating chamber in an approximately circular path.

33. The apparatus of claim 28, wherein the at least one air blower is configured to cause airflow within the heating chamber in a vertical direction.

34. The apparatus of claim 33, wherein the at least one air blower is configured to cause vertical airflow from a lower portion of the heating chamber upwardly to an upper portion of the heating chamber.

35. The apparatus of claim 33, wherein the at least one air blower is configured to cause the vertical airflow at a rate sufficient to selectively move popped flakes out of the heating chamber when popped as a result of the increased drag of the popped flakes.

36. The apparatus of claim 28, wherein the at least one air blower is configured to create airflow in both a vertical direction and a horizontal direction.

* * * * *